(12) United States Patent
Maruyama et al.

(10) Patent No.: US 8,198,834 B2
(45) Date of Patent: Jun. 12, 2012

(54) LED DRIVE CIRCUIT

(75) Inventors: Yasuhiro Maruyama, Osaka (JP); Hiroyuki Shoji, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 351 days.

(21) Appl. No.: 12/536,211

(22) Filed: Aug. 5, 2009

(65) Prior Publication Data
US 2010/0033113 A1 Feb. 11, 2010

(30) Foreign Application Priority Data

Aug. 6, 2008 (JP) ................. 2008-202842
Sep. 4, 2008 (JP) ................. 2008-226788

(51) Int. Cl.
*H05B 37/02* (2006.01)
(52) U.S. Cl. ........................ 315/309; 315/112
(58) Field of Classification Search ................. 315/309, 315/112, 117, 118, 32, 50
See application file for complete search history.

(56) References Cited

U.S. PATENT DOCUMENTS

| 4,528,492 A * | 7/1985 | Inaniwa et al. ............. 320/150 |
| 7,847,486 B2 * | 12/2010 | Ng ............. 315/119 |
| 2009/0021185 A1 * | 1/2009 | Ng ............. 315/294 |

FOREIGN PATENT DOCUMENTS

| CN | 101032188 A | 5/2007 |
| JP | 63-15078 U | 2/1988 |
| JP | 63-89916 A | 4/1988 |
| JP | 11-307815 A | 11/1999 |
| JP | 2000-260578 A | 9/2000 |
| JP | 2006-40584 A | 2/2006 |
| JP | 2007-258227 A | 10/2007 |

* cited by examiner

*Primary Examiner* — Daniel D Chang
(74) *Attorney, Agent, or Firm* — Birch, Stewart, Kolasch & Birch, LLP

(57) ABSTRACT

An LED drive circuit that drives an LED is provided with: a rectifying circuit that converts an alternating voltage into a pulsating current; a constant current circuit; and an over-temperature protection portion that limits an output of the constant current circuit, wherein the LED and the constant current circuit are connected in series on an output side of the rectifying circuit.

29 Claims, 11 Drawing Sheets

LED DRIVE CIRCUIT

This nonprovisional application claims priority under 35 U.S.C. §119(a) on Patent Application No. 2008-202842 filed in Japan on Aug. 6, 2008 and Patent Application No. 2008-226788 filed in Japan on Sep. 4, 2008, the entire contents of which are hereby incorporated by reference.

BACKGROUND OF THE INVENTION

1. Field of the Invention

The present invention relates to an LED drive circuit that drives an LED (light emitting diode).

2. Description of the Related Art

Featuring low power consumption and a long life, etc., the LED finds applications in increasingly wide areas, not only display apparatuses but also lighting equipment, etc. In the lighting equipment, a plurality of LEDs are used to obtain desired illumination.

The LED shortens its life if receiving a current exceeding a rated current value. Therefore, the LED needs to be driven with a constant current or provided with current limitation so that no current above a predetermined level is passed therethrough.

Mostly, general lighting equipment uses a commercially available AC 100 V power source. Thus, given that LED lighting equipment is used to take place of an incandescent lamp, etc., it is preferable that, like the general lighting equipment, the LED lighting equipment be so arranged as to use a commercially available AC 100 V power source as well.

An example of a configuration of a conventional LED drive circuit that can be used in an LED lighting equipment is shown in FIG. 20 (see JP-A-2000-260578). A conventional LED drive circuit shown in FIG. 20 drives an LED with a constant current, and is provided with: a bridge diode 2; a resistor R20_2; and a constant current circuit A20. The constant current circuit A20 is provided with: an NPN transistor Q20; a resistor R20_1; and a Zener diode ZD20.

The bridge diode 2 is, on an input side thereof, connected to a commercially available AC 100 V power source 1 and is, on an output side thereof, connected to an LED module 3 which is a module having a plurality of LEDs connected in series; that is, the bridge diode 2 has a positive polarity output terminal from which the LED module 3, the NPN transistor Q20, and the resistor R20_1 in this order are connected in series. One end of the resistor R20_2 is connected to a connection point where the bridge diode 2 and the LED module 3 are connected together. A base of the NPN transistor Q20 is connected to the other end of the resistor R2_2 and a cathode of the Zener diode ZD20. An anode of the Zener diode ZD20 is connected to the connection point where the resistor R20_1 and the bridge diode 2 are connected together.

With this configuration, an AC voltage outputted from the commercially available AC 100 V power source 1 is fully rectified by the bridge diode 2, and thereby a pulsating voltage having its peak of approximately 141 V is obtained. In the constant current circuit A20, a base potential of the NPN transistor Q20 is clamped to be constant by a Zener voltage $V_Z$ of the Zener diode ZD20. Thus, let the voltage between the base and an emitter of the NPN transistor Q20 be $V_{BEQ20}$, voltages of the resistor R20_1 at both ends thereof are expressed by $(V_Z - V_{BEQ20})$, and let the resistance value of the resistor R20_1 be $R_{20\_1}$, a current passing through the resistor R20_1 is expressed by $(V_Z - V_{BEQ20})/R_{20\_1}$, which means that the current passing through the resistor R20_1 is constant. That is, a current passing through the LED module 3 is constant as expressed by $(V_Z - V_{BEQ20})/R_{20\_1}$.

Typically, the voltage of the Zener diode exhibits positive temperature characteristics (i.e., as a temperature rises, the voltage is increased), and the voltage between the base and emitter of the transistor exhibits negative temperature characteristics (i.e., as a temperature rises, the voltage is decreased), and the resistor exhibits positive temperature characteristics (i.e., as a temperature rises, the resistance value is increased). Accordingly, the constant current circuit A1 exhibits positive temperature characteristics (i.e., as a temperature rises, the constant current value is increased). Thus, with the conventional LED drive circuit shown in FIG. 20, a rise in temperature possibly leads to a current falling beyond a predetermined value injected into the LEDs.

In the conventional LED drive circuit shown in FIG. 20, neither component nor circuit for over-temperature protection is provided for a case where the LED module 3 or the LED drive circuit itself experiences a high rise in temperature. Thus, there is a possibility that the LED module 3 or the LED drive circuit is broken at worst if its ambient temperature rises abnormally high, or if a short circuit occurs between an anode terminal and a cathode terminal of the LED module 3. Moreover, if an excessive load is imposed, an incandescent lamp will fail in an open mode with its filament cut, and the LED module 3 and the LED drive circuit, each of which is formed with a semiconductor component, will fail in a short mode. Therefore, the LED drive circuit has to be so made as not to smoke or to be burned even in the worst case where a short circuit occurs to the LED module 3 or any component forming the LED drive circuit.

There are various protection devices and temperature sensing devices generally used, such as POSISTOR ((registered trademark) manufactured by Murata Manufacturing Co., Ltd., Japan)). However, they all have a low voltage rating and a low power rating, and are limited in applications in a case where no constant DC voltage is generated, and instead a commercial power source is directly connected to the LED drive circuit to drive the LEDs with a pulsating current.

SUMMARY OF THE INVENTION

It is an object of the present invention to provide an LED drive circuit that drives an LED with a pulsating current, and that is equipped with an over-temperature protection function.

To achieve the above object, an LED drive circuit of the present invention drives an LED, and includes: a rectifying circuit that converts an alternating voltage into a pulsating voltage; a constant current circuit; and an over-temperature protection portion that limits an output of the constant current circuit, wherein the LED and the constant current circuit are connected in series on an output side of the rectifying circuit.

Moreover, the over-temperature protection portion may include: a PNP transistor; and a resistor having a negative temperature coefficient, and provided between the base and an emitter of the PNP transistor. In addition, the emitter and a collector of the PNP transistor may be connected to a path through which a constant current outputted from the constant current circuit is passed. In either of the cases, for example, the over-temperature protection portion may further include a constant current source connected in series with the resistor having the negative temperature coefficient, wherein a value of a voltage between the base and the emitter of the PNP transistor is a product obtained by multiplying a constant current value of the constant current source by a resistance value of the resistor having the negative temperature coefficient. Or the over-temperature protection portion may further include a resistor element connected in series with the resistor having the negative temperature coefficient, wherein a value of a voltage between the base and the emitter of the PNP transistor is a product obtained by multiplying a current value of a current passing through the resistor having the negative temperature coefficient and the resistor element by a resistance value of the resistor having the negative temperature coefficient.

Or the over-temperature protection portion may include: an NPN transistor; and a resistor having a negative temperature coefficient, and provided between a base and an emitter of the NPN transistor, wherein the emitter and a collector of the NPN transistor is connected to a path through which a constant current outputted from the constant current circuit is passed.

Moreover, the LED drive circuit may further include a switching circuit that switches turning-on and -off of the constant current circuit, wherein the LED, the constant current circuit, and the switching circuit are connected in series on an output side of the rectifying circuit, and the over-temperature protection portion controls the switching circuit. In this case, for example, the over-temperature protection portion may include: a bipolar transistor that feeds a bias current to a control terminal of the switching circuit; and a resistor having a negative temperature coefficient, and having one end thereof connected to a base of the bipolar transistor, wherein a value of a voltage between the base and an emitter of the bipolar transistor is varied in accordance with a resistance value of the resistor having the negative temperature coefficient. Or the over-temperature protection portion may include: an NPN transistor that pulls a bias current that is fed to a control terminal of the switching circuit; a resistor having a positive temperature coefficient, and having one end thereof connected to a base of the NPN transistor, wherein a value of a voltage between the base and an emitter of the NPN transistor is varied in accordance with a resistance value of the resistor having the positive temperature coefficient. In addition, the over-temperature protection portion may further include: a constant current source connected in series with the resistor having the negative temperature coefficient or the resistor having the positive temperature coefficient, wherein a value of the voltage between the base and the emitter of the bipolar transistor or the NPN transistor is a product obtained by multiplying a constant current value of the constant current source by the resistance value of the resistor having the negative temperature coefficient or the resistor having the positive temperature coefficient. Or the over-temperature protection portion may further include a resistor element connected in series with the resistor having the negative temperature coefficient or the resistor having the positive temperature coefficient, wherein a value of the voltage between the base and the emitter of the bipolar transistor or the NPN transistor is a product obtained by multiplying a value of a current passing through the resistor having the negative temperature coefficient or the resistor having the positive temperature coefficient and the resistor element by the resistance value of the resistor having the negative temperature coefficient or the resistor having the positive temperature coefficient.

Or, in the drive circuit of the present invention, the over-temperature protection portion may include: an NPN transistor that pulls a bias current that is fed to the constant current circuit; and a resistor having a positive temperature coefficient, and provided between a base and an emitter of the NPN transistor. In addition, for example, the over-temperature protection portion may further include: a constant current source connected in series with the resistor having the positive temperature coefficient, wherein a value of a voltage between the base and the emitter of the NPN transistor is a product obtained by multiplying a constant current value of the constant current source by a resistance value of the resistor having the positive temperature coefficient. Or the over-temperature protection portion may further include: a resistor element connected in series with the resistor having the positive temperature coefficient, wherein a value of a voltage between the base and the emitter of the NPN transistor is a product obtained by multiplying a value of a current passing through the resistor having the positive temperature coefficient and the resistor element by a resistance value of the resistor having the positive temperature coefficient. In either of the cases, the over-temperature protection portion may further include: another resistor having a positive temperature coefficient, and provided separately from the resistor having the positive temperature coefficient, wherein the other resistor having the positive temperature coefficient is provided on a path through which the bias current is fed to the constant current circuit.

Or, in the drive circuit of the present invention, the over-temperature protection portion may include: an NPN bipolar transistor that feeds a bias current to a bias current terminal of the constant current circuit; an NPN bipolar transistor for control and a first constant current source, each connected to a base of the NPN bipolar transistor and provided for controlling the bias current; a resistor having a positive temperature coefficient, and having one end thereof connected to a base of the NPN bipolar transistor for control; and a second constant current source connected in series with the resistor having the positive temperature coefficient, wherein a value of a voltage between the base and an emitter of the NPN bipolar transistor for control is a product obtained by multiplying a constant current value of the second constant current source by a resistance value of the resistor having the positive temperature coefficient. Or the over-temperature protection portion may include: an NPN bipolar transistor that feeds a bias current to a bias current terminal of the constant current circuit; an NPN bipolar transistor for control and a resistor element, each connected to a base of the NPN-bipolar transistor and provided for controlling the bias current; a resistor having a positive temperature coefficient, and having one end thereof connected to a base of the NPN bipolar transistor for control; and a constant current source connected in series with the resistor having the positive temperature coefficient, wherein a value of a voltage between the base and an emitter of the NPN bipolar transistor for control is a product obtained by multiplying a constant current value of the constant current source by a resistance value of the resistor having the positive temperature coefficient. Or the over-temperature protection portion may include: an NPN bipolar transistor that feeds a bias current to a bias current terminal of the constant current circuit; an NPN bipolar transistor for control and a first resistor element, each connected to a base of the NPN bipolar transistor and provided for controlling the bias current; a resistor having a positive temperature coefficient, and having one end thereof connected to a base of the NPN bipolar transistor for control; and a second resistor element connected in series with the resistor having the positive temperature coefficient, wherein a value of a voltage between the base and an emitter of the NPN bipolar transistor for control is a product obtained by multiplying a value of a current passing through the resistor having the positive temperature coefficient and the second resistor element by a resistance value of the resistor having the positive temperature coefficient.

Moreover, for example, the constant current circuit may include: a first resistor; a Zener diode; and a first bipolar transistor having an emitter thereof connected to one end of the first resistor and a base thereof connected to one end of the Zener diode. Or the constant current circuit may include: a first bipolar transistor; a second bipolar transistor; a first resistor having one end thereof connected to a base of the second bipolar transistor; and a second resistor provided between a base and an emitter of the first bipolar transistor, wherein a collector of the first bipolar transistor and the base of the second bipolar transistor are connected together, and the base of the first bipolar transistor and an emitter of the second bipolar transistor are connected together.

Moreover, for example, the switching circuit may include: a thyristor or a triac; and a first resistor provided between a gate and a cathode of the thyristor or the triac.

Moreover, in a case where the LED drive circuit further includes a switching circuit that switches turning-on and -off of the constant current circuit, wherein the LED, the constant current circuit, and the switching circuit are connected in series on an output side of the rectifying circuit, and so that the over-temperature protection portion controls the switching circuit, the switching circuit includes: a thyristor or a triac; and a first resistor provided between a gate and a cathode of the thyristor or the triac, the over-temperature protection portion may include: a resistor having a positive temperature coefficient, and provided on a path for feeding a bias current to the gate of the thyristor or the triac; and a resistor element provided between the gate of the thyristor or the triac and a negative polarity output end of the rectifying circuit. Furthermore, the over-temperature protection portion may further include: a capacity connected in parallel with the resistor element.

Moreover, in a case where the LED drive circuit includes a switching circuit that switches turning-on and -off of the constant current circuit, wherein the LED, the constant current circuit, and the switching circuit are connected in series on an output side of the rectifying circuit, and so that the over-temperature protection portion controls the switching circuit, the switching circuit includes: a thyristor or a triac; and a first resistor provided between a gate and a cathode of the thyristor or the triac, the over-temperature protection portion may include: a resistor having a positive temperature coefficient and having one end thereof connected to the gate of the thyristor or the triac; and a resistor element provided between another end of the resistor having the positive temperature coefficient and a negative polarity output end of the rectifying circuit. Furthermore, the over-temperature protection portion may further include: another resistor having a positive temperature coefficient, and provided separately from the resistor having the positive temperature coefficient, wherein the other resistor having the positive temperature coefficient is provided on a path through which a bias current is fed to the gate of the thyristor or the triac.

Moreover, the over-temperature protection portion may limit the output of the constant current circuit when the constant current circuit reaches a predetermined temperature or higher.

Moreover, the over-temperature protection portion may limit the output of the constant current circuit when the LED module reaches a predetermined value or higher.

DETAILED DESCRIPTION OF PREFERRED EMBODIMENTS

Hereinafter, embodiments of an LED drive circuit according to the present invention will be described with reference to the accompanying drawings. An LED drive circuit according to the present invention is provided for use in illumination equipment, an electronic display system and the like.

<First Embodiment>

Figure 1:
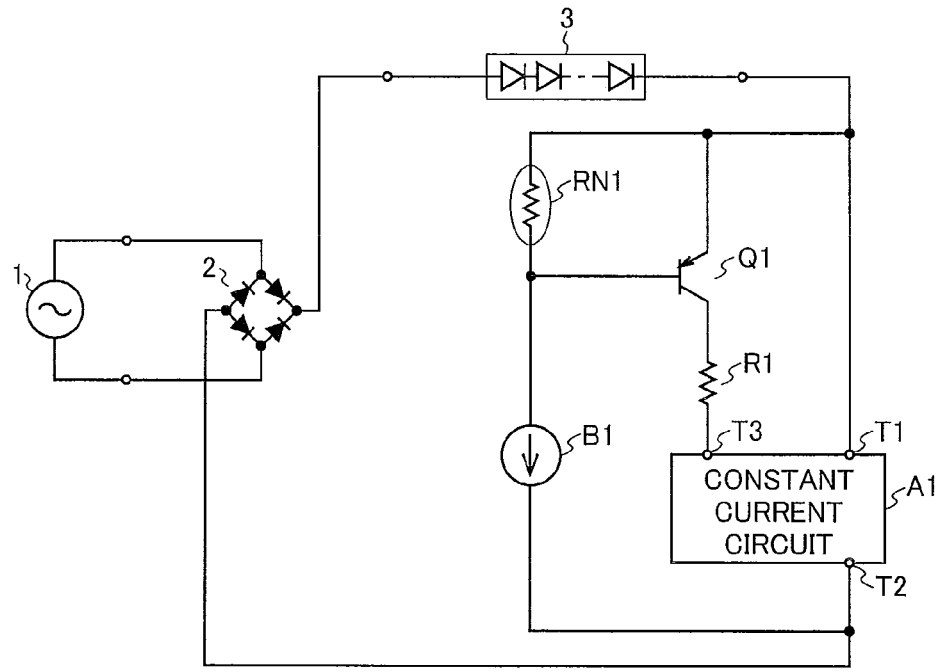
FIG. 1 is a diagram showing a configuration of an LED drive circuit according to a first embodiment of the present invention.

A configuration of an LED drive circuit according to a first embodiment of the present invention is shown in FIG. 1. The LED drive circuit of this embodiment shown in FIG. 1 is provided with: a bridge diode 2; constant current circuits A1 and B1; a PNP transistor Q1; a resistor R1; and a negative temperature coefficient resistor RN1 such as an NTC thermistor (hereinafter, referred to as "NTC resistor RN1").

The bridge diode 2 is, at an input end thereof, connected to a commercially available AC 100 V power source 1 and is, at one output end thereof, connected to an anode of the LED module 3. The constant current circuit A1 is, at a constant current terminal T1 thereof, connected to a cathode of the LED module 3 and is, at a constant current terminal T2 thereof, connected to the other output end of the bridge diode 2. The PNP transistor Q1 is, at an emitter thereof, connected to a cathode of the LED module 3 and is, at a collector thereof, connected to a bias current terminal T3 of the constant current circuit A1 via the resistor R1. Moreover, the NTC resistor RN1 is provided between a base and an emitter of the PNP transistor Q1, and the constant current circuit B1 is provided between the base of the PNP transistor Q1 and the other output end of the bridge diode 2.

The PNP transistor Q1 is driven by the constant current circuit B1, and feeds a bias current to the bias current terminal T3 of the constant current circuit A1. In the LED drive circuit of this embodiment shown in FIG. 1, an output of the constant current circuit A1 that feeds a constant current to the LED module 3 and that thereby drives that LED module 3 is limited by limiting the bias current that is fed by the PNP transistor Q1 to the bias current terminal T3 of the constant current circuit A1 via the resistor R1. With this design, a burden on the PNP transistor Q1 is reduced, thus making it possible to use a comparatively small transistor for the PNP transistor Q1 so as to limit the output of the constant current circuit A1.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A1 (constant current value of the constant current circuit A1).

In the LED drive circuit of this embodiment shown in FIG. 1, as the ambient temperature rises, a resistance value of the NTC resistor RN1 is reduced, leading to a decrease in voltage between the base and the emitter of the PNP transistor Q1. Accordingly, the bias current that is fed to the bias current terminal T3 of the constant current circuit A1 is decreased, with the result that the constant current value of the constant current circuit A1 is limited. When the ambient temperature of the LED drive circuit of this embodiment shown in FIG. 1 reaches a certain level set in advance or higher, the PNP transistor Q1 is placed in an off state, with the result that no bias current is fed to the bias current terminal T3 of the constant current circuit A1. Thus, the constant current circuit A1 is placed in an off state.

With the NTC resistor RN1 arranged between the base and the emitter of the PNP transistor Q1, it is possible to use, for the NTC resistor RN1, a device whose power rating is low or a device whose withstand voltage is not high, without problem, by setting its resistance value to an appropriate value.

Moreover, the constant current circuit B1 feeds a base current to the PNP transistor Q1, and has a constant current value equal to $1/h_{FE}$ (where $h_{FE}$ is an h parameter of the PNP transistor Q1) of the bias current that is fed to the bias current terminal T3 of the constant current circuit A1. With that taken into account together with the over-temperature protection operation leading to the PNP transistor Q1 in the off state, it is possible to use, for the constant current circuit B1, a device whose power rating is low or a device whose withstand voltage is not high, without problem, by setting its constant current value to an appropriate value.

<Second Embodiment>

Figure 2:
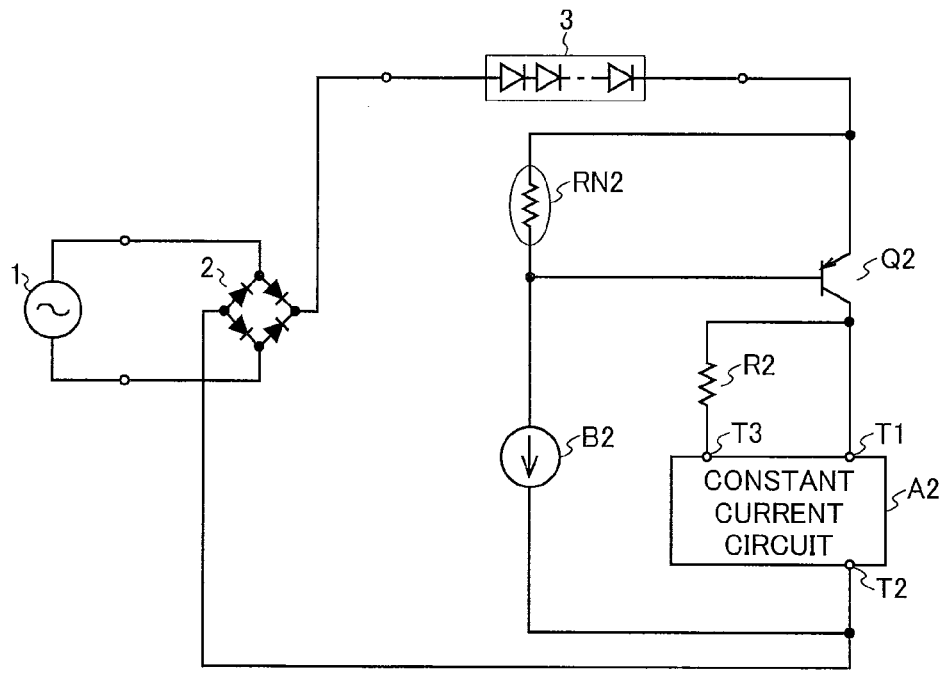
FIG. 2 is a diagram showing a configuration of an LED drive circuit according to a second embodiment of the present invention.

A configuration of an LED drive circuit according to a second embodiment of the present invention is shown in FIG. 2. The LED drive circuit of this embodiment shown in FIG. 2 is provided with: a bridge diode 2; constant current circuits A2 and B2; a PNP transistor Q2; a resistor R2; and a negative temperature coefficient resistor (hereinafter, referred to as "NTC resistor") RN2.

The bridge diode 2 is, at an input end thereof, connected to the commercially available AC 100 V power source 1 and is, at one output end thereof, connected to the anode of the LED module 3. The cathode of the LED module 3 is connected to an emitter of the PNP transistor Q2. The constant current circuit A2 is, at a constant current terminal T1 thereof, connected to a collector of the PNP transistor Q2 and is, at a constant current terminal T2 thereof, connected to the other output end of the bridge diode 2. Moreover, the collector of the PNP transistor Q2 is connected to a bias current terminal T3 of the constant current circuit A2 via the resistor R2. Furthermore, the NTC resistor RN2 is provided between a base and the emitter of the PNP transistor Q2, and the constant current circuit B2 is provided between the base of the PNP transistor Q2 and the other output end of the bridge diode 2.

The PNP transistor Q2 is driven by the constant current circuit B2. An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A2 (constant current value of the constant current circuit A2).

In the LED drive circuit of this embodiment shown in FIG. 2, as the ambient temperature rises, a resistance value of the NTC resistor RN2 is reduced, leading to a decrease in voltage between the base and the emitter of the PNP transistor Q2. Consequently, the constant current value of the constant current circuit A2 is limited. When the ambient temperature of the LED drive circuit of this embodiment shown in FIG. 2 reaches a certain level set in advance or higher, the PNP transistor Q2 is placed in the off state, and accordingly, the constant current circuit A2 is placed in the off state.

With the NTC resistor RN2 arranged between the base and the emitter of the PNP transistor Q2, it is possible to use, for the NTC resistor RN2, a device whose power rating is low or a device whose withstand voltage is not high, without problem, by setting its resistance value to an appropriate value.

Moreover, the constant current circuit B2 feeds a base current to the PNP transistor Q2, and has a constant current value equal to $1/h_{FE}$ (where $h_{FE}$ is an h parameter of the PNP transistor Q2) of an output current of the constant current circuit A2. With that taken into account together with the over-temperature protection operation leading to the PNP transistor Q2 in the off state, it is possible to use, for the constant current circuit B2, a device whose power rating is low or a device whose withstand voltage is not high, without problem, by setting its constant current value to an appropriate value.

<Third Embodiment>

Figure 3:
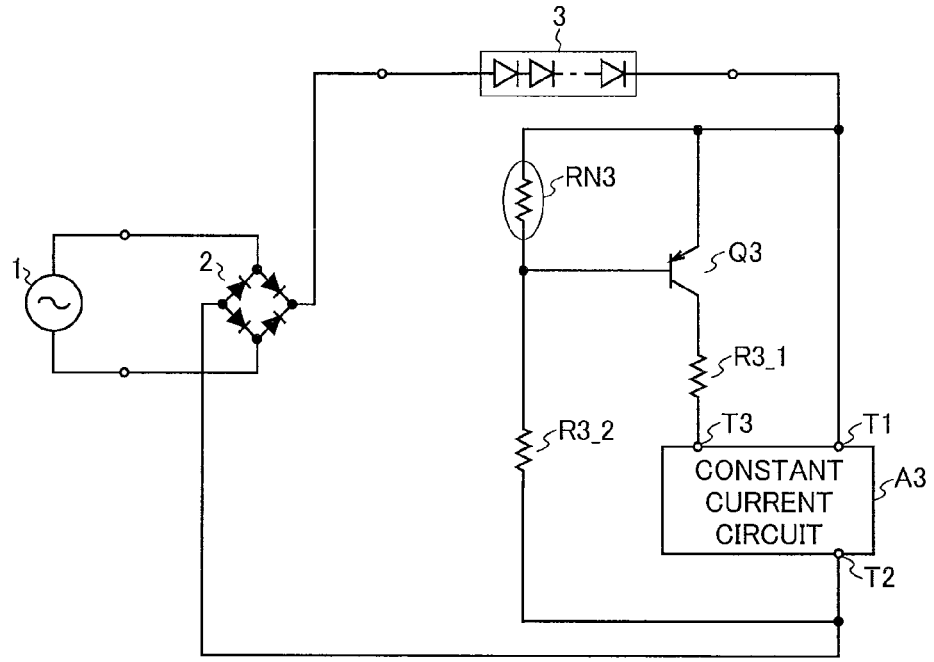
FIG. 3 is a diagram showing a configuration of an LED drive circuit according to a third embodiment of the present invention.

A configuration of an LED drive circuit according to a third embodiment of the present invention is shown in FIG. 3. The LED drive circuit of this embodiment shown in FIG. 3 is provided with: a bridge diode 2; a constant current circuit A3; a PNP transistor Q3; resistors R3_1 and R3_2; a negative temperature coefficient resistor (hereinafter, referred to as "NTC resistor") RN3.

The bridge diode 2 is, at an input end thereof, connected to the commercially available AC 100 V power source 1 and is, at one output end thereof, connected to the anode of the LED module 3. The constant current circuit A3 is, at a constant current terminal T1 thereof, connected to the cathode of the LED module 3 and is, at a constant current terminal T2 thereof, connected to the other output end of the bridge diode 2. Moreover, the PNP transistor Q3 is, at an emitter thereof, connected to the cathode of the LED module 3 and is, at a collector thereof, connected to a bias current terminal T3 of the constant current circuit A3 via the resistor R3_1. Furthermore, the NTC resistor RN3 is provided between a base and the emitter of the PNP transistor Q3, and the resistor R3_2 is provided between the base of the PNP transistor Q3 and the other output end of the bridge diode 2.

The PNP transistor Q3 is driven by the NTC resistor RN3 and the resistor R3_2, and feeds a bias current to the bias current terminal T3 of the constant current circuit A3. In the LED drive circuit of this embodiment shown in FIG. 3, an output of the constant current circuit A3 that feeds a constant current to the LED module 3 and that thereby drives that LED module 3 is limited by limiting the bias current that is fed by the PNP transistor Q3 to the bias current terminal T3 of the constant current circuit A3 via the resistor R3_1. With this design, a burden on the PNP transistor Q3 is reduced, thus making it possible to use a comparatively small transistor for the PNP transistor Q3 so as to limit the output of the constant current circuit A3.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current A3 (constant current value of the constant current circuit A3).

In the LED drive circuit of this embodiment shown in FIG. 3, as the ambient temperature rises, a resistance value of the NTC resistor RN3 is reduced, leading to a decrease in voltage between the base and the emitter of the PNP transistor Q3. Accordingly, the bias current that is fed to the bias current terminal T3 of the constant current circuit A3 is decreased, with the result that the constant current value of the constant current circuit A3 is limited. When the ambient temperature of the LED drive circuit of this embodiment shown in FIG. 3 reaches a certain level set in advance or higher, the PNP transistor Q3 is placed in the off state, with the result that no bias current is fed to the bias current terminal T3 of the constant current circuit A3. Thus, the constant current circuit A3 is placed in the off state.

With the NTC resistor RN3 arranged between the base and the emitter of the PNP transistor Q3, it is possible to use, for the NTC resistor RN3, a device whose power rating is low or a device whose withstand voltage is not high, without problem, by setting its resistance value to an appropriate value.

Moreover, the resistor R3_2 feeds a base current to the PNP transistor Q3, and a current passing through the resistor R3_2 is equal to $1/h_{FE}$ (where $h_{FE}$ is an h parameter of the PNP transistor Q3) of the bias current that is fed to the bias current terminal T3 of the constant current circuit A3. With that taken into account together with the over-temperature protection operation leading to the PNP transistor Q3 in the off state, it is possible to use, for the resistor R3_2, a device whose power rating is low or a device whose withstand voltage is not high, without problem, by setting the value of the current passing through the resistor R3_2 to an appropriate value.

A same modification can be made to the configuration shown in FIG. 2 as the modification made from FIG. 1 to FIG. 3. That is, the constant current circuit B2 can be replaced by a resistor having an appropriate resistance value.

<Fourth Embodiment>

Figure 4:
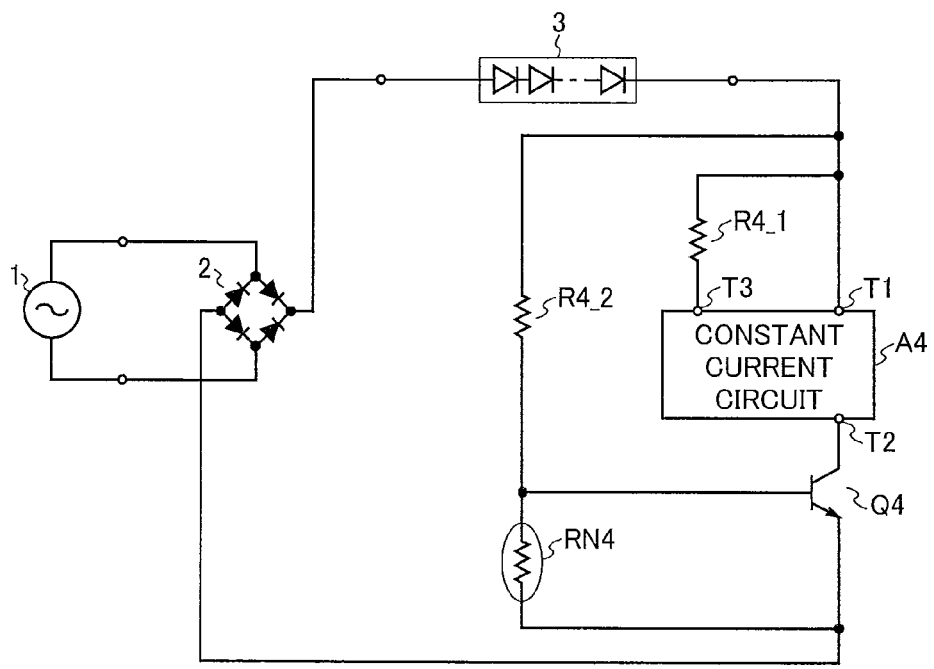
FIG. 4 is a diagram showing a configuration of an LED drive circuit according to a fourth embodiment of the present invention.

A configuration of an LED drive circuit according to a fourth embodiment of the present invention is shown in FIG. 4. The LED drive circuit of this embodiment shown in FIG. 4 is provided with: a bridge diode 2; a constant current circuit A4; an NPN transistor Q4; resistors R4_1 and R4_2; and a negative temperature coefficient resistor (hereinafter, referred to as "NTC resistor") RN4.

The bridge diode 2 is, at an input end thereof, connected to the commercially available AC 100 V power source 1 and is, at one output end thereof, connected to the anode of the LED module 3. The constant current circuit A4 is, at a constant current terminal T1 thereof, connected to the cathode of the LED module 3 and is, at a constant current terminal T2 thereof, connected to a collector of the NPN transistor Q4. An emitter of the NPN transistor Q4 is connected to the other output end of the bridge diode 2. Moreover, the cathode of the LED module 3 is connected to a bias current terminal T3 of the constant current circuit A4 via the resistor R4_1. Furthermore, the resistor R4_2 is provided between the cathode of the LED module 3 and a base of the NPN transistor Q4, and the NTC resistor RN4 is provided between the base and the emitter of the NPN transistor Q4.

The NPN transistor Q4 is driven by the resistor R4_2 and the NTC resistor RN4. An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A4 (constant current value of the constant current circuit A4).

In the LED drive circuit of this embodiment shown in FIG. 4, as the ambient temperature rises, a resistance value of the NTC resistor RN4 is reduced, leading to a decrease in voltage between the base and the emitter of the NPN transistor Q4. Consequently, the constant current value of the constant current circuit A4 is limited. When the ambient temperature of the LED drive circuit of this embodiment shown in FIG. 4 reaches a certain level set in advance or higher, the NPN transistor Q4 is placed in the off state, and accordingly, the constant current circuit A4 is placed in the off state.

With the NTC resistor RN4 arranged between the base and the emitter of the NPN transistor Q4, it is possible to use, for the NTC resistor RN4, a device whose power rating is low or a device whose withstand voltage is not high, without problem, by setting its resistance value to an appropriate value.

Moreover, the resistor R4_2 feeds a base current to the NPN transistor Q4, and a current passing through the resistor R4_2 is equal to $1/h_{FE}$ (where $h_{FE}$ is an h parameter of the NPN transistor Q4) of an output current of the constant current circuit A4. With that taken into account together with the over-temperature protection operation leading to the NPN transistor Q4 in the off state, it is possible to use, for the resistor R4_2, a device whose power rating is low or a device whose withstand voltage is not high, without problem, by setting the value of the current passing through the resistor R4_2 to an appropriate value.

<Fifth Embodiment>

Figure 5:
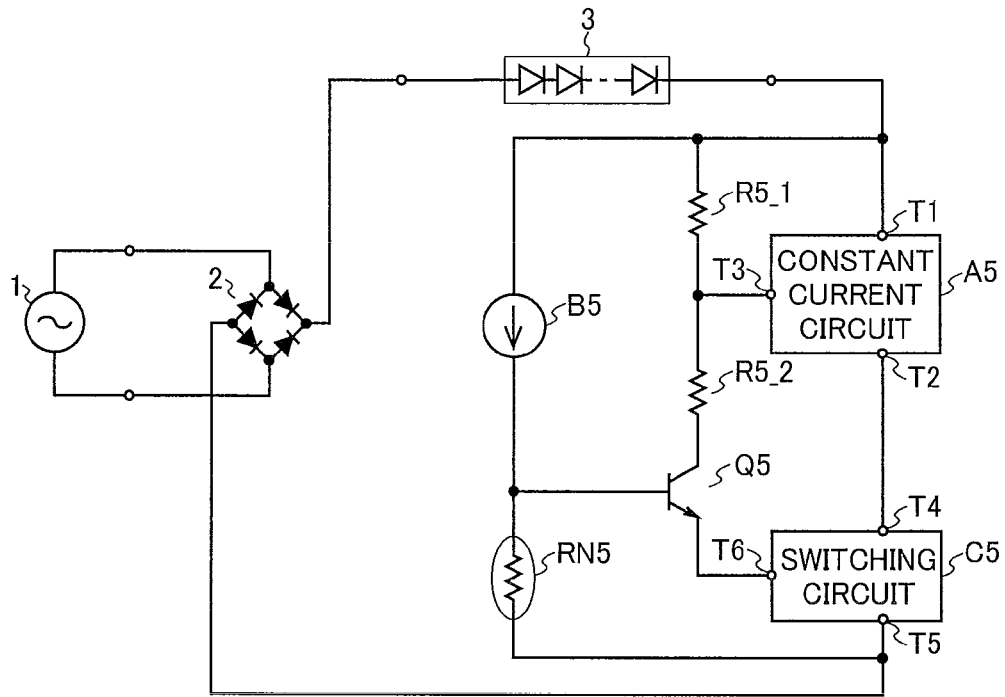
FIG. 5 is a diagram showing a configuration of an LED drive circuit according to a fifth embodiment of the present invention.

A configuration of an LED drive circuit according to a fifth embodiment of the present invention is shown in FIG. 5. The LED drive circuit of this embodiment shown in FIG. 5 is provided with: a bridge diode 2; constant current circuits A5 and B5; a switching circuit C5; resistors R5_1 and R5_2; an NPN transistor Q5; and a negative temperature coefficient resistor (hereinafter, referred to as "NTC resistor") RN5. The switching circuit C5 is formed such that if a bias current fed to a control terminal T6 thereof is equal to or more than a predetermined value, a path between a contact terminal T4 and a contact terminal T5 thereof becomes electrically conductive, and that if the bias current fed to the control terminal T6 thereof is lower than the predetermined value, the path between the contact terminal T4 and the contact terminal T5 thereof becomes electrically nonconductive.

The bridge diode 2 is, at an input end thereof, connected to the commercially available AC 100 V power source 1 and is, at one output end thereof, connected to the anode of the LED module 3. The constant current circuit A5 is, at a constant current terminal T1 thereof, connected to the cathode of the LED module 3 and is, at a constant current terminal T2 thereof, connected to the contact terminal T4 of the switching circuit C5. The contact terminal T5 of the switching circuit C5 is connected to the other output end of the bridge diode 2. Moreover, the resistor R5_1 is, at one end thereof, connected to the cathode of the LED module 3 and is, at the other end thereof, connected to a bias current terminal T3 of the constant current circuit A5 and one end of the resistor R5_2. The other end of the resistor R5_2 is connected to a collector of an NPN transistor Q5, and an emitter of the NPN transistor Q5 is connected to the control terminal T6 of the switching circuit C5. Furthermore, the constant current circuit B5 is provided between the cathode of the LED module 3 and a base of the NPN transistor Q5, and the NTC resistor RN5 is provided between the base of the NPN transistor Q5 and the other output end of the bridge diode 2.

The NPN transistor Q5 is driven by the constant current circuit B5, and feeds a bias current to the control terminal T6 of the switching circuit C5. In the LED drive circuit of this embodiment shown in FIG. 5, an output of the constant current circuit A5 that feeds a constant current to the LED module 3 and that thereby drives that LED module 3 is limited by limiting the bias current of the switching circuit C5. With this design, a burden on the NPN transistor Q5 is reduced, thus making it possible to use a comparatively small transistor for the NPN transistor Q5 so as to limit the output of the constant current circuit A5.

An AC voltage outputted from the commercially available AC 100 V power source 1 is fully rectified by the bridge diode 2, and thereby a pulsating voltage having its peak approximately 141 V is obtained and applied to the LED module 3. Accordingly, a current passing through the LED module 3 is made to pulsate as well, with its peak value equal to a value set for the constant current circuit A5 (constant current value of the constant current circuit A5).

In the LED drive circuit of this embodiment shown in FIG. 5, as the ambient temperature rises, a resistance value of the NTC resistor RN5 is reduced, leading to a decrease in voltage between the base and the emitter of the NPN transistor Q5. Accordingly, the bias current that is fed to the control terminal T6 of the switching circuit C5 is decreased, with the result that the constant current value of the constant current circuit A5 is limited. When the ambient temperature of the LED drive circuit of this embodiment shown in FIG. 5 reaches a certain level set in advance or higher, the NPN transistor Q5 is placed in the off state, with the result that no bias current is fed to the control terminal T6 of the switching circuit C5. Thus, the constant current circuit A5 is placed in the off state.

With the NTC resistor RN5 connected to the base of the NPN transistor Q5, it is possible to use, for the NTC resistor RN5, a device whose power rating is low or a device whose withstand voltage is not high, without problem, by setting its resistance value to an appropriate value.

Moreover, the constant current circuit B5 feeds a base current to the NPN transistor Q5, and has a constant current value equal to $1/h_{FE}$ (where $h_{FE}$ is an h parameter of the NPN transistor Q5) of the bias current that is fed to the control terminal T6 of the switching circuit C5. With that taken into account together with the over-temperature protection operation leading to the NPN transistor Q5 in the off state, it is possible to use, for the constant current circuit B5, a device whose power rating is low or a device whose withstand voltage is not high, without problem, by setting its constant current value to an appropriate value.

<Sixth Embodiment>

Figure 6:
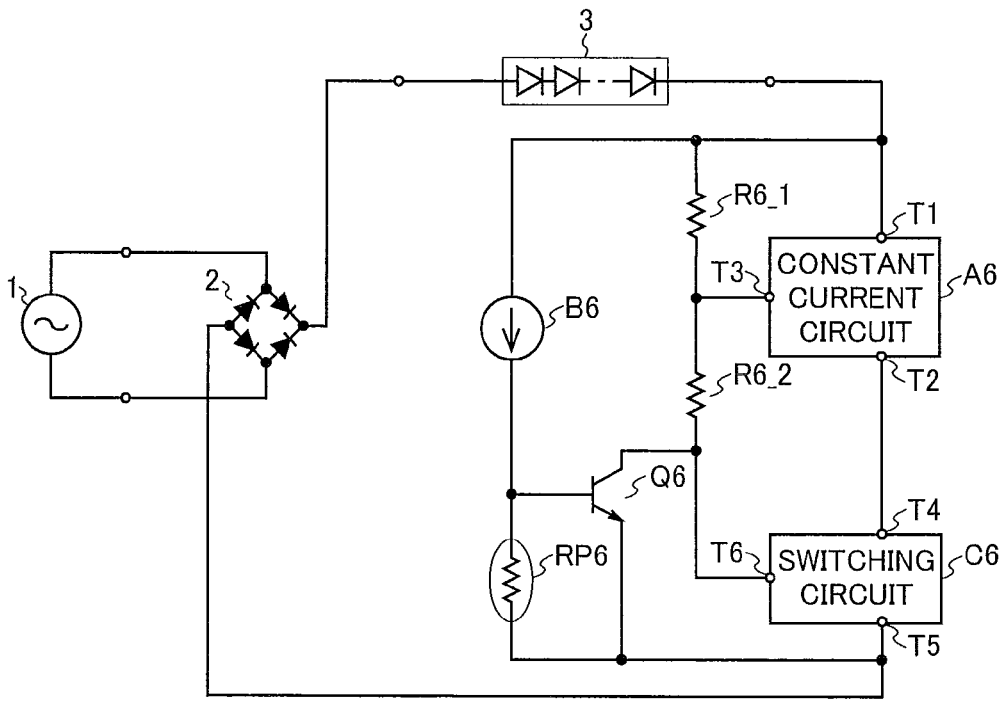
FIG. 6 is a diagram showing a configuration of an LED drive circuit according to a sixth embodiment of the present invention.

A configuration of an LED drive circuit according to a sixth embodiment of the present invention is shown in FIG. 6. The LED drive circuit of this embodiment shown in FIG. 6 is provided with: a bridge diode 2; constant current circuits A6 and B6; a switching circuit C6; resistors R6_1 and R6_2; an NPN transistor Q6; and a positive temperature coefficient resistor RP6 such as a PTC thermistor (hereinafter, referred to as "PTC resistor RP6"). The switching circuit C6 is formed such that if a bias current fed to a control terminal T6 thereof is equal to or more than a predetermined value, a path between a contact terminal T4 and a contact terminal T5 thereof becomes electrically conductive, and that if the bias current fed to the control terminal T6 thereof is lower than the predetermined value, the path between the contact terminal T4 and the contact terminal T5 thereof becomes electrically nonconductive.

The bridge diode 2 is, at an input end thereof, connected to the commercially available AC 100 power source 1 and is, at one output end thereof, connected to the anode of the LED module 3. The constant current circuit A6 is, at a constant current terminal T1 thereof, connected to the cathode of the LED module 3 and is, at a constant current terminal T2 thereof, connected to the contact terminal T4 of the switching circuit C6. The contact terminal T5 of the switching circuit C6 is connected to the other output end of the bridge diode 2. Moreover, the resistor R6_1 is, at one end thereof, connected the cathode of the LED module 3 and is, at the other end thereof, connected to a bias current terminal T3 of the constant current circuit A6 and one end of the resistor R6_2. The other end of the resistor R6_2 is connected to the control terminal T6 of the switching circuit C6 and a collector of the NPN transistor Q6, and an emitter of the NPN transistor Q6 is connected to the other output end of the bridge diode 2. Moreover, the constant current circuit B6 is provided between the cathode of the LED module 3 and a base of the NPN transistor Q6, and the PTC resistor RP6 is provided between the base and the emitter of the NPN transistor Q6.

There is a current passing from the constant current circuit B6 to the PCT resistor RP6, and a constant current value of the constant current circuit B6 and a resistance value of the PTC resistor RP6 are set so that the NPN transistor Q6 remains in the off state at a normal temperature. Moreover, from the cathode of the LED module 3, a bias current is fed to the control terminal T6 of the switching circuit C6 via the resistors R6_1 and R6_2.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A6 (constant current value of the constant current circuit A6).

In the LED drive circuit of this embodiment shown in FIG. 6, as the ambient temperature rises, a resistance value of the PTC resistor RP6 is increased, leading to an increase in voltage between the base and the emitter of the NPN transistor Q6. Accordingly, the NPN transistor Q6 decreases a bias current that is fed to the control terminal T6 of the switching circuit C6, with the result that a constant current value of the constant current circuit A6 is limited. When the ambient temperature of the LED drive circuit of this embodiment shown in FIG. 6 reaches a certain level set in advance or higher, the NPN transistor Q6 pulls all of the bias current that is fed to the control terminal T6 of the switching circuit C6, with the result that no bias current is fed to the control terminal T6 of the switching circuit C6. Thus, the constant current circuit A6 is placed in the off state.

In the LED drive circuit of this embodiment shown in FIG. 6, an output of the constant current circuit A6 that feeds the constant current to the LED module 3 and that thereby drives the LED module 3 is limited by limiting the bias current that is fed to the switching circuit C6. With this design, a burden on the NPN transistor Q6 is reduced, thus making it possible to use a comparatively small transistor for the NPN transistor Q6 so as to limit the output of the constant current circuit A6.

With the PTC resistor RP6 arranged between the base and the emitter of the NPN transistor Q6, it is possible to use, for the PTC resistor RP6, a device whose power rating is low and a device whose withstand voltage is not high, without problem, by setting its resistance value to an appropriate value.

Moreover, the constant current circuit B6 feeds a base current to the NPN transistor Q6, and so that the NPN transistor Q6, when placed in the on state owing to the over-temperature protection operation, pulls all of the bias current that is fed to the control terminal T6 of the switching circuit C6, it is sufficient that the constant current circuit B6 can feed a current equal to or more than $1/h_{FE}$ (where $h_{FE}$ is an h parameter of the NPN transistor Q6) of the bias current that is fed to the control terminal T6 of the switching circuit Q6. Thus, it is possible to use, for the constant current circuit B6, a device whose power rating is low or a device whose withstand voltage is not high, without problem, by setting its constant current value to an appropriate value.

<Seventh Embodiment>

Figure 7A:
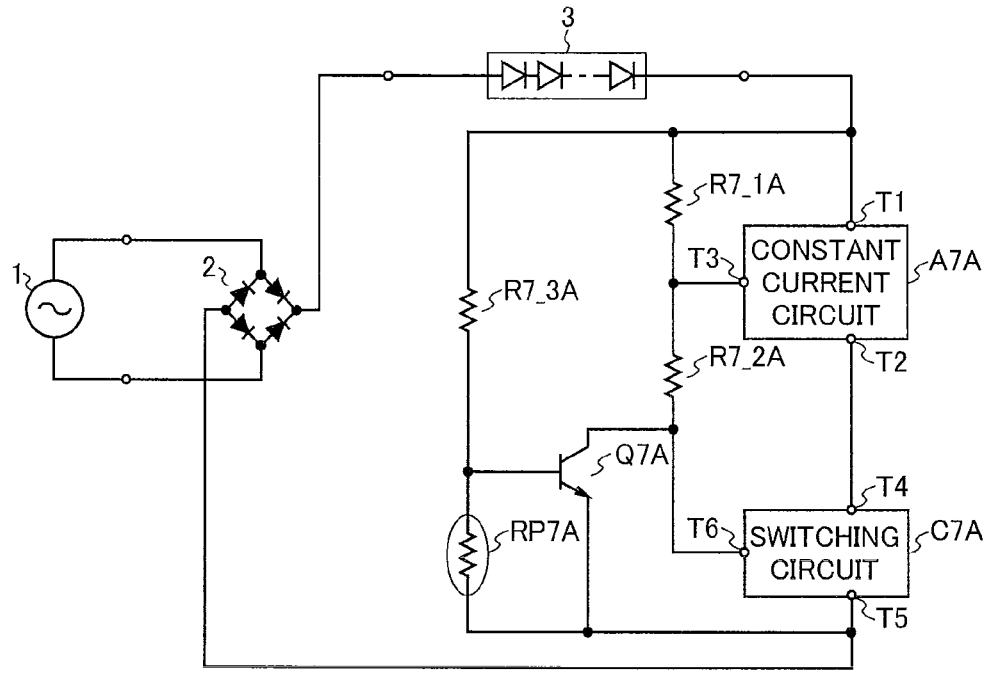
FIG. 7A is a diagram showing an example of a configuration of an LED drive circuit according to a seventh embodiment of the present invention.

A configuration of an example of an LED drive circuit according to a seventh embodiment of the present invention is shown in FIG. 7A. The LED drive circuit of this embodiment shown in FIG. 7A is provided with: a bridge diode 2; a constant current circuit A7A; a switching circuit C7A; resistors R7_1A to R7_3A; an NPN transistor Q7A; and a positive temperature coefficient resistor (hereinafter, referred to as "PTC resistor") RP7A. The switching circuit C7A is formed such that if a bias current fed to a control terminal T6 thereof is equal to or more than a predetermined value, a path between a contact terminal T4 and a contact terminal T5 thereof becomes electrically conductive, and that if the bias current fed to the control terminal T6 thereof is lower than the predetermined value, the path between the contact terminal T4 and the contact terminal T5 thereof becomes electrically non-conductive.

The bridge diode 2 is, at an input end thereof, connected to the commercially available AC 100 V power source 1 and is, at one output end thereof, connected to the anode of the LED module 3. The constant current circuit A7A is, at a constant current terminal T1 thereof, connected to the cathode of the LED module 3 and is, at a constant current terminal T2 thereof, connected to the contact terminal T4 of the switching circuit C7A. The contact terminal T5 of the switching circuit C7A is connected to the other output end of the bridge diode 2. Moreover, the resistor R7_1A is, at one end thereof, connected to the cathode of the LED module 3 and is, at the other end thereof, connected to a bias current terminal T3 of the constant current circuit A7A and one end of the resistor R7_2A. The other end of the resistor R7_2A is connected to the control terminal T6 of the switching circuit C7A and a collector of the NPN transistor Q7A, and an emitter of the NPN transistor Q7A is connected to the other output end of the bridge diode 2. Furthermore, the resistor R7_3A is provided between the cathode of the LED module 3 and a base of the NPN transistor Q7A, and the PTC resistor RP7A is provided between the base and the emitter of the NPN transistor Q7A.

There is a current passing from the resistor R7_3A to the PTC resistor RP7A, and resistance values of the resistor R7_3A and the PTC resistor RP7A are set so that the NPN transistor Q7A remains in the off state at a normal temperature. Moreover, from the cathode of the LED module 3, a bias current is fed to the control terminal T6 of the switching circuit C7A via the resistors R7_1A and R7_2A.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A7A (constant current value of the constant current circuit A7A).

In the LED drive circuit of this embodiment shown in FIG. 7A, as the ambient temperature rises, a resistance value of the PTC resistor RP7A is increased, leading to an increase in voltage between the base and the emitter of the NPN transistor Q7A. Accordingly, the NPN transistor Q7A decreases a bias current that is fed to the control terminal T6 of the switching circuit C7A, with the result that the constant current value of the constant current circuit A7A is limited. When the ambient temperature of the LED drive circuit of this embodiment shown in FIG. 7A reaches a certain level set in advance or higher, the NPN transistor Q7A pulls all of the bias current that is fed to the control terminal T6 of the switching circuit C7A, with the result that no bias current is fed to the control terminal T6 of the switching C7A. Thus, the constant current circuit A7A is placed in the off state.

In the LED drive circuit of this embodiment shown in FIG. 7, an output of the constant current circuit A7A that feeds a constant current to the LED module 3 and that thereby drives the LED module 3 is limited by limiting a bias current for the switching circuit C7A. With this design, a burden on the NPN transistor Q7A is reduced, thus making it possible to use a comparatively small transistor for the NPN transistor Q7A so as to limit the output of the constant current circuit A7A.

With the PTC resistor RP7A arranged between the base and the emitter of the NPN transistor Q7A, it is possible to use, for the PTC resistor RP7A, a device whose power rating is low or a device whose withstand voltage is not high, without problem, by setting its resistance value to an appropriate value.

Moreover, the resistor R7_3A feeds a base current to the NPN transistor Q7A, and so that the NPN transistor Q7A, when placed in the on state owing to the over-temperature protection operation, pulls all of the bias current that is fed to the control terminal T6 of the switching circuit C7A, it is sufficient that the resistor R7_3 can feed a current equal to or more than $1/h_{FE}$ (where $h_{FE}$ is an h parameter of the NPN transistor Q7A) of the bias current that is fed to the control terminal T6 of the switching circuit C7A. Thus, it is possible to use, for the resistor R7_3, a device whose rate power is low or a device whose withstand voltage is not high, without problem, by setting the value of the current passing through the resistor R7_3A to an appropriate value.

Figure 7B:
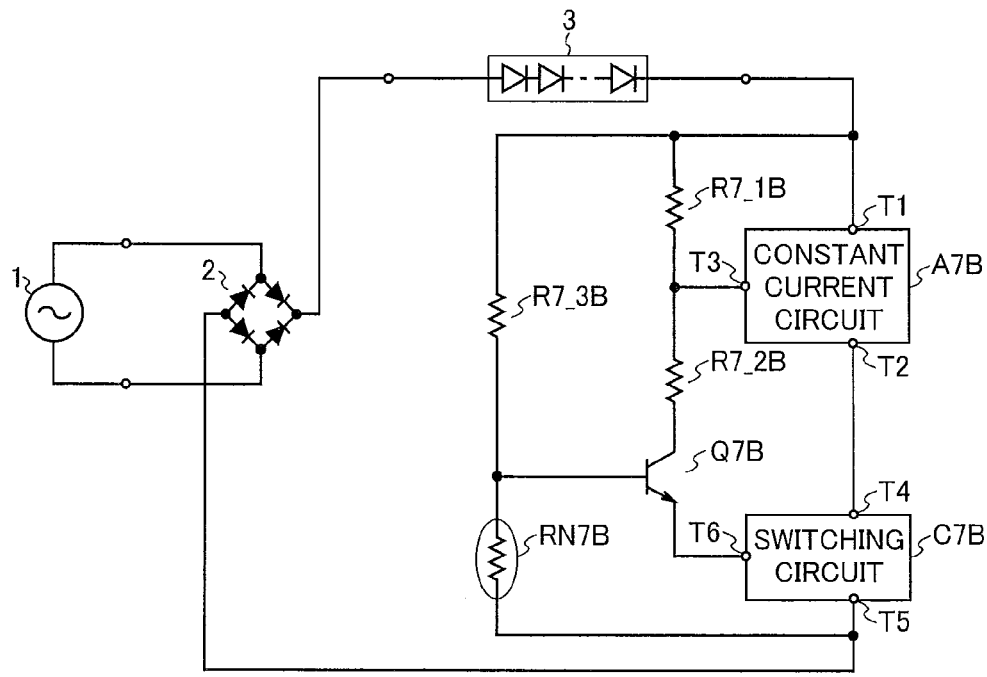
FIG. 7B is a diagram showing another example of the configuration of the LED drive circuit according to the seventh embodiment of the present invention.

Another example of the configuration of the LED drive circuit according to the seventh embodiment of the present invention is shown in FIG. 7B. The configuration shown in FIG. 7B is obtained by making a same modification to the configuration shown in FIG. 5 as the modification made from FIG. 6 to FIG. 7A, that is, by using the resistor R7_3B instead of the constant current circuit B5. The resistor R7_3B feeds a base current to the NPN transistor Q7B, and a current passing through the resistor R7_3B is equal to $1/h_{FE}$ (where $h_{FE}$ is an h parameter of the NPN transistor Q7B) of the bias current that is fed to the control terminal T6 of the switching circuit C7B. With that taken into account together with the over-temperature protection operation leading to the NPN transistor Q7B in the off state, it is possible to use, for the resistor R7_3B, a device whose power rating is low or a device whose withstand voltage is not high, without problem, by setting the value of the current passing through the resistor R7_3B to an appropriate value.

<Eighth Embodiment>

Figure 8:
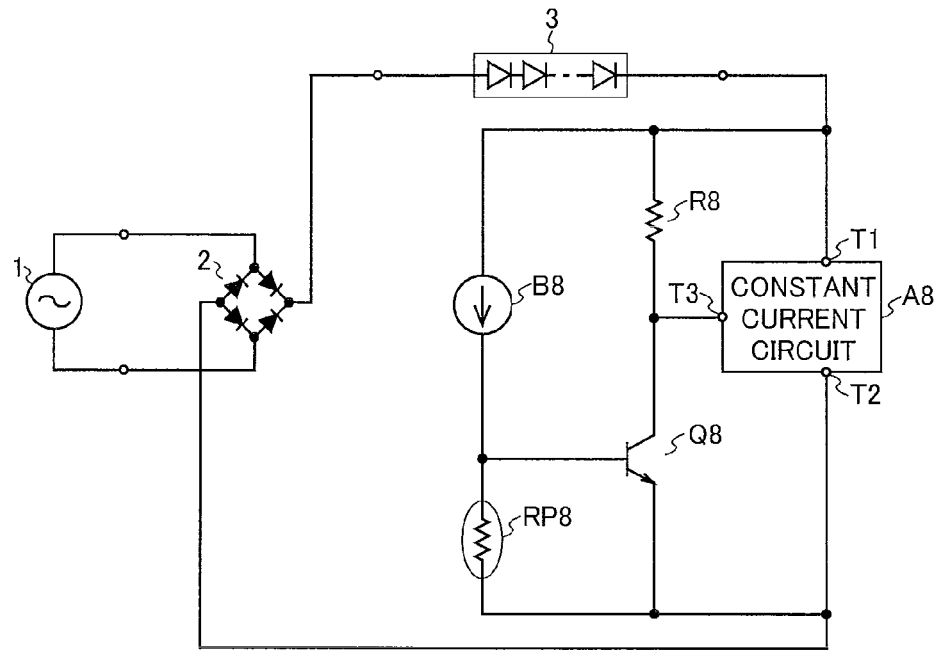
FIG. 8 is a diagram showing a configuration of an LED drive circuit according to an eighth embodiment of the present invention.

A configuration of an LED drive circuit according to an eighth embodiment of the present invention is shown in FIG. 8. The LED drive circuit of this embodiment shown in FIG. 8 is provided with: a bridge diode 2; constant current circuits A8 and B8; a resistor R8; an NPN transistor Q8; and a positive temperature coefficient resistor (hereinafter, referred to as "PTC resistor") RP8.

The bridge diode 2 is, at an input end thereof, connected to the commercially available power AC 100 V power source 1 and is, at one output end thereof, connected to the anode of the LED module 3. The constant current circuit A8 is, at a constant current terminal T1 thereof, connected to the cathode of the LED module 3, and is, at a constant current terminal T2 thereof, connected to the other output end of the bridge diode 2. Moreover, the resistor R8 is, at one end thereof, connected to the cathode of the LED module 3 and is, at the other end thereof, connected to a bias current terminal T3 of the constant current circuit A8 and a collector of the NPN transistor Q8. An emitter of the NPN transistor Q8 is connected to the other output end of the bride diode 2. Furthermore, the constant current circuit B8 is provided between the cathode of the LED module 3 and a base of the NPN transistor Q8, and the PTC resistor RP8 is provided between the base and the emitter of the NPN transistor Q8.

There is a current passing from the constant current circuit B8 to the PTC resistor RP8, and a constant current value of the constant current circuit B8 and a resistance value of the PTC resistor RP8 are set so that the NPN transistor Q8 remains in the off state at a normal temperature. Moreover, from the cathode of the LED module 3, a bias current is fed to the bias current terminal T3 of the constant current circuit A8 via the resistor R8.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A8 (constant current value of the constant current circuit A8).

In the LED drive circuit of this embodiment shown in FIG. 8, as the ambient temperature rises, a resistance value of the PTC resistor RP8 is increased, leading to an increase in a voltage between the base and the emitter of the NPN transistor Q8. Accordingly, the NPN transistor Q8 deceases a bias current that is fed to the bias current terminal T3 of the constant current circuit A8, with the result that the constant current value of the constant current circuit A8 is limited. When the ambient temperature of the LED drive circuit of this embodiment shown in FIG. 8 reaches a certain level set in advance or higher, the NPN transistor Q8 pulls all of the bias current that is fed to the bias current terminal T3 of the constant current circuit A8, with the result that no bias current is fed to the bias current terminal T3 of the constant current circuit A8. Thus, the constant current circuit A8 is placed in the off state.

In the LED drive circuit of this embodiment shown in FIG. 8, an output of the constant current circuit A8 that feeds a constant current to the LED module 3 and that thereby drives the LED module 3 is limited directly by the NPN transistor Q8. This makes it possible to reduce the dimension of a resulting circuit despite a burden on the NPN transistor Q8 being somewhat heavy.

With the PTC resistor RP8 arranged between the base and the emitter of the NPN transistor Q8, it is possible to use, for the PTC resistor RP8, a device whose power rating is low or a device whose withstand voltage is not high, without problem, by setting its resistance value to an appropriate value.

Moreover, the constant current circuit B8 feeds a base current to the NPN transistor Q8, and so that the NPN transistor Q8, when placed in the on state owing to the over-temperature protection operation, pulls all of the bias current that is fed to the bias current terminal T3 of the constant current circuit A8, it is sufficient that the constant current circuit B8 can feed a current equal to or more than $1/h_{FE}$ (where $h_{FE}$ is an h parameter of the NPN transistor Q8) of the bias current that is fed to the control terminal T3 of the constant current circuit A8. Thus, it is possible to use, for the constant current circuit B8, a device whose power rating is low or a device whose withstand voltage is not high, without problem, by setting its constant current value to an appropriate value.

<Ninth Embodiment>

Figure 9:
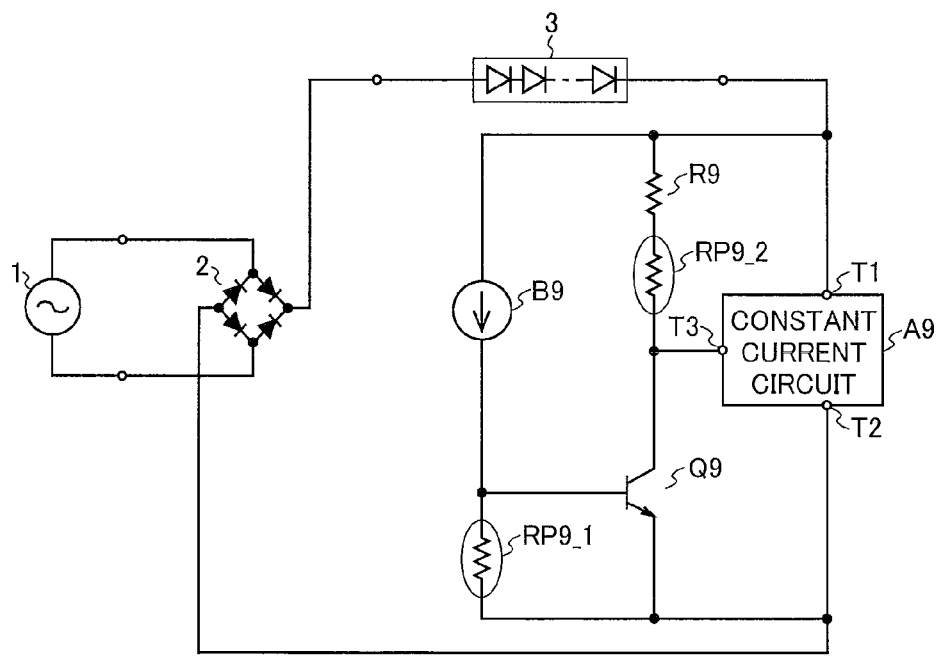
FIG. 9 is a diagram showing a configuration of an LED drive circuit according to a ninth embodiment of the present invention.

A configuration of an LED drive circuit according to a ninth embodiment of the present invention is shown in FIG. 9. The LED drive circuit of this embodiment shown in FIG. 9 is provided with: a bridge diode 2; constant current circuits A9 and B9; a resistor R9; an NPN transistor Q9; and positive temperature coefficient resistors (hereinafter, referred to as "PTC resistors") RP9_1 and RP9_2.

The bridge diode 2 is, at an input end thereof, connected to the commercial available AC 100 V power source 1 and is, at one output end thereof, connected to the anode of the LED module 3. The constant current circuit A9 is, at a constant current terminal T1 thereof, connected to the cathode of the LED module 3 and is, at a constant current terminal T2 thereof, connected to the other output end of the bridge diode 2. Moreover, the resistor R9 is, at one end thereof, connected to the cathode of the LED module 3 and is, at the other end thereof, connected to a bias current terminal T3 of the constant current circuit A9 and a collector of the NPN transistor Q9 via the PTC resistor RP9_2. An emitter of the NPN transistor Q9 is connected to the other output end of the bridge diode 2. Moreover, the constant current circuit B9 is provided between the cathode of the LED module 3 and a base of the NPN transistor Q9, and the PTC resistor RP9_1 is provided between the base and the emitter of the NPN transistor Q9.

There is a current passing from the constant current circuit B9 to the PTC resistor RP9_1, and a constant current value of the constant current circuit B9 and a resistance value of the PTC resistor RP9_1 are set so that the NPN transistor Q9 remains in the off state at a normal temperature. Moreover, from the cathode of the LED module 3, a bias current is fed to the bias current terminal T3 of the constant current circuit A9 via the resistor R9 and the PTC resistor R9_2.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A9 (constant current value of the constant current circuit A9).

In the LED drive circuit of this embodiment shown in FIG. 9, as the ambient temperature rises, resistance values of the PTC resistor RP9_1 and the PTC resistor RP9_2 are increased, leading to an increase in voltage between the base and the emitter of the NPN transistor Q9. Accordingly, the NPN transistor Q9 decreases a bias current that is fed to the bias current terminal T3 of the constant current circuit A9, with the result that the constant current value of the constant current circuit A9 is limited. Moreover, the bias current that is fed to the bias current terminal T3 of the constant current circuit A9 is also limited by using the resistance value of the PTC resistor R9_2. When the ambient temperature of the LED drive circuit of this embodiment shown in FIG. 9 reaches a certain level set in advance or higher, the NPN transistor Q9 pulls all of the bias current that is fed to the bias current terminal T3 of the constant current circuit A9, with the result that no bias current is fed to the bias current terminal T3 of the constant current A9. Thus, the constant current circuit A9 is placed in the off state.

In the LED drive circuit of this embodiment shown in FIG. 9, the PTC resistor R9_2 limits a bias current that is fed to the bias current terminal T3 of the constant current circuit A9 that feeds a constant current to the LED module 3 and that thereby drives that LED module 3, and the NPN transistor Q9 then directly pulls that bias current. Thus, an output of the constant current circuit A9 is limited more rapidly.

With the PTC resistor RP9_1 arranged between the base and the emitter of the NPN transistor Q9, it is possible to use, for the PTC resistor RP9_1, a device whose power rating is low or a device having whose withstand voltage is not high, without problem, by setting its resistance value to an appropriate value.

Moreover, the constant current circuit B9 feeds a base current to the NPN transistor Q9, and so that the NPN transistor Q9, when placed in the on state owing to the over-temperature protection operation, pulls all of the bias current that is fed to the bias current terminal T3 of the constant current circuit A9, it is sufficient that the constant current circuit B9 can feed a current equal to or more than $1/h_{FE}$ (where $h_{FE}$ is an h parameter of the NPN transistor Q9) of the bias current that is fed to the bias current terminal T3 of the constant current circuit A9. Thus, it is possible to use, for the constant current circuit B9, a device whose rate power is low or a device whose withstand voltage is not high, without problem, by setting its constant current value to an appropriate value.

The PCT resistor RP9_2 is applied by a pulsating voltage resulting from division by the PTC resistor RP9_2 and the resistor R9. Therefore, the PCT resistor RP9_2 needs to be set to a resistance value obtained by using values falling below its power rating and voltage rating.

A same modification can be made to the configuration shown in FIG. 8 and to the configuration shown in FIG. 9 as the modification made from FIG. 6 to FIG. 7A. That is, the constant current circuits B8 and B9 can be replaced by a resistor having an appropriate resistance value.

<Example of a Configuration of the Constant Current Circuit>

Figure 10:
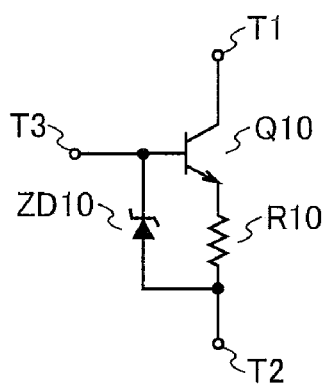
FIG. 10 is a diagram showing an example of a configuration of a constant current circuit.

Next, an example of a configuration of a constant current circuit that feeds a constant current to the LED module and that thereby drives that LED module, namely the constant current circuits A1 to A6, A7A, A7B, A8, and A9 in the above-described first to ninth embodiments is shown in FIG. 10. The constant current circuit shown in FIG. 10 is provided with: an NPN transistor Q10; a resistor R10; a Zener diode ZD10; constant current terminals T1 and T2; and a bias current terminal T3.

A base of the NPN transistor Q10 is connected to a cathode of the Zener diode ZD 10 and the bias current terminal T3, a collector of the NPN transistor Q10 is connected to the constant current terminal T1, and an emitter of the NPN transistor Q10 is connected to an anode of the Zener diode ZD10 and the constant current terminal T2 via the resistor R10.

Figure 11:
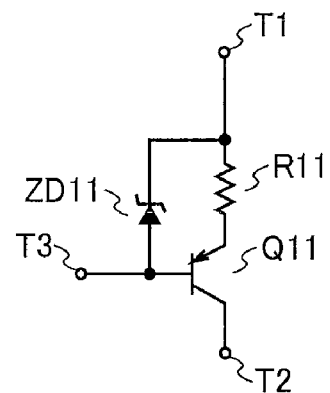
FIG. 11 is a diagram showing another example of the configuration of the constant current circuit.

Moreover, another example of a configuration of a constant current circuit that feeds a constant current to the LED module and that thereby drives that LED module, namely the constant current circuits A1 to A6, A7A, A7B, A8, and A9 in the above-described first to ninth embodiments is shown in FIG. 11. The constant current circuit shown in FIG. 11 is provided with: a PNP transistor Q11; a resistor R11; a Zener diode ZD11; constant current terminals T1 and T2; and a bias current terminal T3.

A base of the PNP transistor Q11 is connected to an anode of the Zener diode ZD11 and the bias current terminal T3, an emitter of the PNP transistor Q11 is connected to a cathode of the Zener diode ZD11 and the constant current terminal T1 via the resistor R11, and a collector of the PNP transistor Q11 is connected to the constant current terminal T2.

Both constant current values of the constant current circuits shown in FIGS. 10 and 11 are expressed by $(V_Z - V_{BE})/R$, where $V_Z$ represents a Zener voltage of the Zener diode ZD10 or ZD11, $V_{BE}$ represents a voltage between the base and the emitter of the NPN transistor Q10 or the PNP transistor Q11, and R represents a resistance value of the resistor R10 or R11.

The constant current circuit shown in FIG. 10 and the constant current circuit shown in FIG. 11 can also be employed in tenth to thirteenth embodiments, which will be described later.

Figure 12:
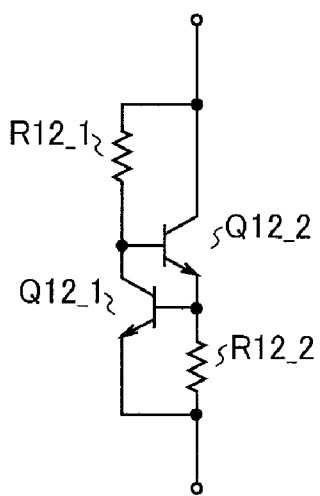
FIG. 12 is a diagram showing yet another example of the configuration of the constant current circuit.

Next, an example of a configuration of a constant current circuit that injects a current into a negative temperature coefficient resistor (hereinafter, referred to as "NTC resistor") or a positive temperature coefficient resistor (hereinafter, referred to as "PTC resistor"), namely the constant current circuits B1, B2, B5, B6, B8, and B9 in the above-described first, second, fifth, sixth, eighth, and ninth embodiments is shown in FIG. 12. The constant current circuit shown in FIG. 12 is provided with: NPN transistors Q12_1 and Q12_2, and resistors R12_1 and R12_2.

The NPN transistor Q12_1 is, at a base thereof, connected to an emitter of the NPN transistor Q12_2 and one end of the resistor R12_2 and is, at a collector thereof, connected to a base of the NPN transistor Q12_2 and one end of the resistor R12_1. The other end of the resistor R12_1 and a collector of the NPN transistor Q12_2 are connected to a constant current terminal on one side of the constant current circuit. An emitter of the NPN transistor Q12_1 and the other end of the resistor R12_2 are connected to a constant current terminal on the other side of the constant current circuit.

Figure 13:
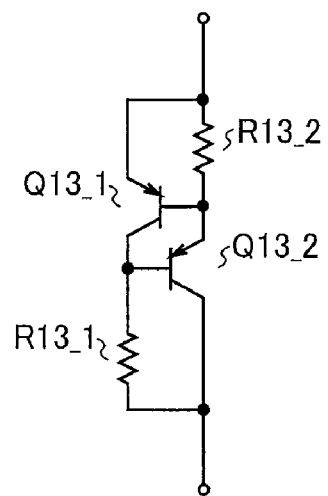
FIG. 13 is a diagram showing yet another example of the configuration of the constant current circuit.

Moreover, another example of a configuration of a constant current circuit that injects a current into a negative temperature coefficient resistor (hereinafter, referred to as "NTC resistor") or a positive temperature coefficient resistor (hereinafter, referred to as "PTC resistor"), namely the constant current circuits B1, B2, B5, B6, B8, and B9 in the above-described first, second, fifth, sixth, eighth, and ninth embodiments is shown in FIG. 13. The constant current circuit shown in FIG. 13 is provided with: PNP transistors Q13_1 and Q13_2; and resistors R13_1 and R13_2.

The PNP transistor Q13_1 is, at a base thereof, connected to an emitter of the PNP transistor Q 13_2 and one end of the resistor R13_2 and is, at a collector thereof, connected to the base of the PNP transistor Q13_2 and one end of the resistor R13_1. An emitter of the PNP transistor Q13_1 and the other end of the resistor R13_2 are connected to a constant current terminal on one side of the constant current circuit, and the other end of the resistor R13_1 and the collector of the PNP transistor Q13_2 are connected to a constant current terminal on the other side of the constant current circuit.

Both constant current values of the constant current circuits shown in FIGS. 12 and 13 are expressed by $V_{BE}/R$, where $V_{BE}$ represents a voltage between the base and the emitter of each of the transistors, and R represents a resistance value of each of the resister.

The constant current circuit shown in FIG. 10 or 11 can be used as a constant current circuit that injects a current into a negative temperature coefficient resistor or a positive temperature coefficient resistor, namely each of the constant current circuits B1, B2, B5, B6, B8, and B9 in the above-described first, second, fifth, sixth, eighth, and ninth embodiments, so long as the bias current terminal T3, and either the constant current terminal T1 or T2 are connected together via a resistor having an appropriate value.

The constant current circuit shown in FIG. 12 or 13 can be used as a constant current circuit that feeds a constant current to the LED module and that thereby drives that LED module, namely each of the constant current circuits A1 to A6, A7A, A7B, A8, and A9 in the above-described first to ninth embodiments, so long as a bias current terminal is so arranged as to be connected to the base of the NPN transistor Q12_2 or the PNP transistor Q13_2. Moreover, they can also be employed in the tenth to thirteenth embodiments, which will be described later.

<Example of a Configuration for the Switching Circuit>

Figure 14:
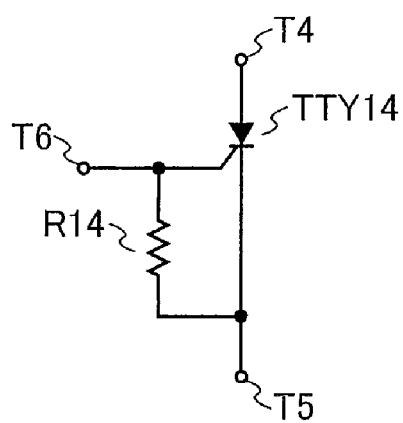
FIG. 14 is a diagram showing an example of a configuration of a switching circuit.

Next, an example of a configuration of a switching circuit, namely the switching circuits C5, C6, C7A, and C7B in the above-described fifth to seventh embodiments is shown in FIG. 14. The switching circuit shown in FIG. 14 is provided with: a thyristor TTY14; a resistor R14; contact terminals T4 and T5; and a control terminal T6. A gate of the thyristor TTY14 is connected to the control terminal T6 and one end of the resistor R14 an anode of the thyristor TTY14 is connected to the contact terminal T4, and a cathode of the thyristor TTY14 and the other end of resistor R14 are connected to the contact terminal T5.

Figure 15:
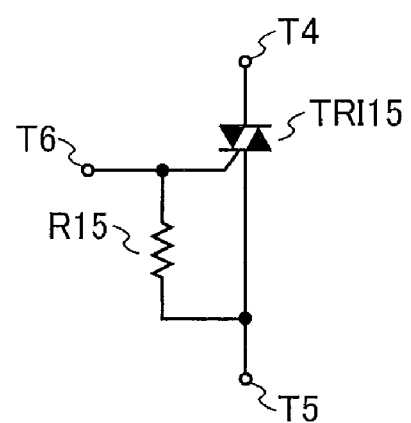
FIG. 15 is a diagram showing another example of the configuration of the switching circuit.

Another example of a configuration of a switching circuit, namely the switching circuits C5, C6, C7A, and C7B in the above-described fifth to seventh embodiments is shown in FIG. 15. The switching circuit shown in FIG. 15 is provided with: a triac TRI15; a resistor R15; contact terminals T4 and T5; and a control terminal T6. A gate of the triac TRI15 is connected to the control terminal T6 and one end of the resistor R15, an anode of the triac TRI15 is connected to the contact terminal T4, and a cathode of the TRI15 and the other end of the resistor R15 are connected to the contact terminal T5.

<Tenth Embodiment>

Figure 16:
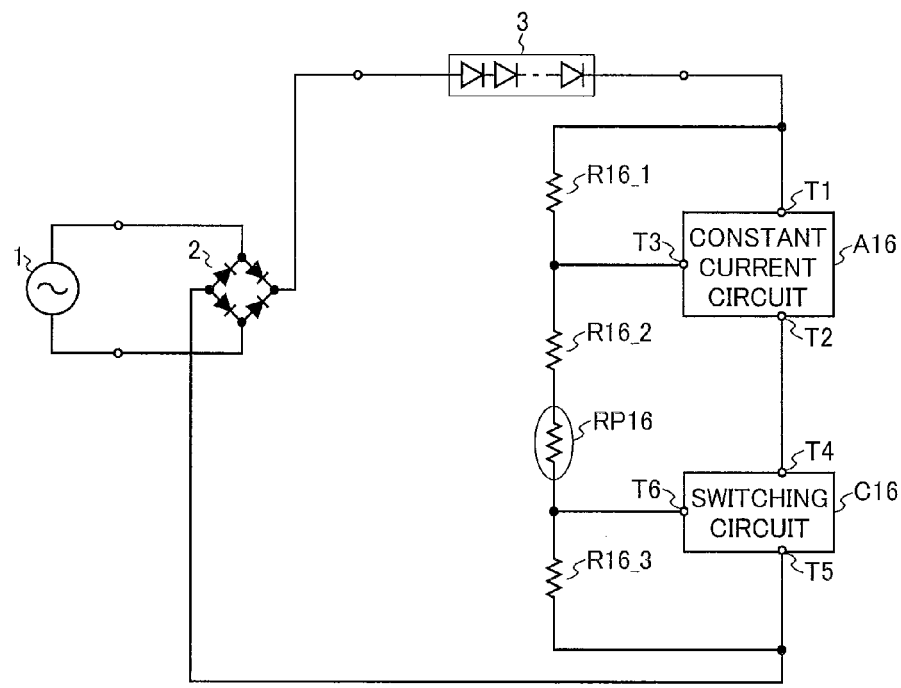
FIG. 16 is a diagram showing a configuration of an LED drive circuit according to a tenth embodiment of the present invention.

Next, a configuration of an LED drive circuit according to a tenth embodiment of the present invention is shown in FIG. 16. The LED drive circuit of this embodiment shown in FIG. 16 is provided with: a bridge diode 2; a constant current circuit A16; a switching circuit C16; resistors R16_1 to R16_3; and a positive temperature coefficient (hereinafter, referred to as "PTC resistor") RP16. Note that the switching circuit C16 is configured as shown in FIG. 14 or FIG. 15.

The bridge diode 2 is, at an input end thereof, connected to the commercially available AC 100 V power source 1 and is, at one output end thereof, connected to the anode of the LED module 3. The constant current circuit A16 is, at a constant current terminal T1 thereof, connected to the cathode of the LED module 3 and is, at a constant current terminal T2 thereof, connected to the contact terminal T4 of switching circuit C16. The contact terminal T5 of the switching circuit C16 is connected to the other output end of the bridge diode 2. Moreover, the resistor R16_1 is, at one end thereof, connected to the cathode of the LED module 3 and is, at the other end thereof, connected to the bias current terminal T3 of the constant current circuit A16 and one end of the resistor R16_2. The other end of the resistor R16_2 is connected to the control terminal T6 of the switching circuit C16 and one end of the resistor R16_3 via the PTC resistor RP16. The other end of the resistor R16_3 is connected to the other output end of the bridge diode 2.

From the cathode of the LED module 3, a bias current is fed to the control terminal T6 of the switching circuit C16 via the resistors R16_1 and R16_2 and the PCT resistor RP16.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A16 (constant current value of the constant current circuit A16).

In the LED drive circuit of this embodiment shown in FIG. 16, as the ambient temperature rises, a resistance value of the PTC resistor RP16 is increased; accordingly, a phase angle of the thyristor or triac inside the switching circuit C16 is delayed, with the result that the constant current value of the constant current circuit A16 is limited. When the ambient temperature of the LED drive circuit of this embodiment shown in FIG. 16 reaches a certain level set in advance or higher, the thyristor or triac inside the switching circuit C16 runs short of a gate current; consequently, the switching circuit C16 is placed in the off state, and the constant current circuit A16 is placed in the off state.

<Eleventh Embodiment>

Figure 17:
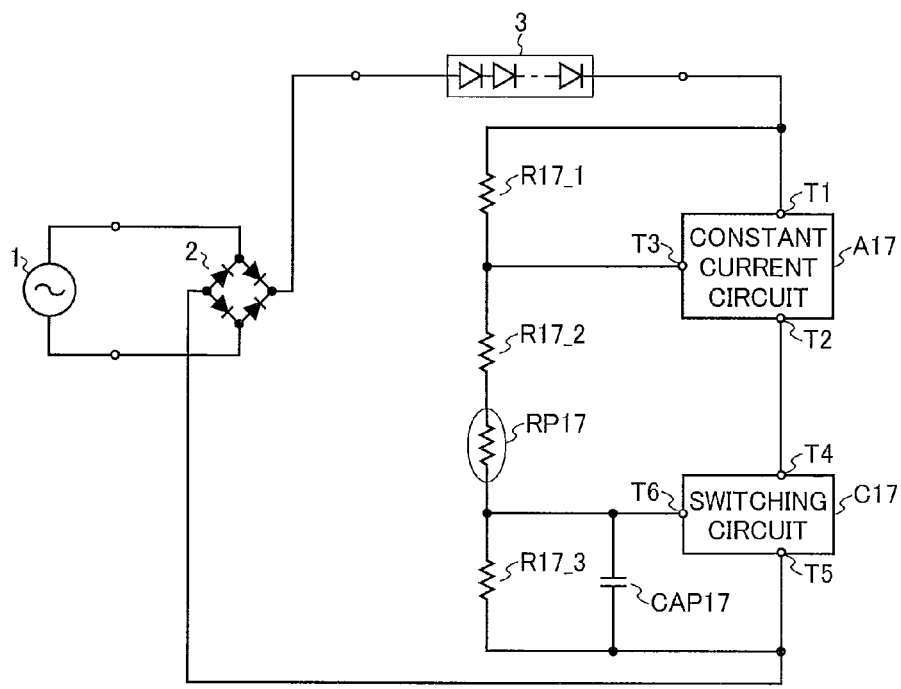
FIG. 17 is a diagram showing a configuration of an LED drive circuit according to an eleventh embodiment of the present invention.

A configuration of an LED drive circuit according to an eleventh embodiment of the present invention is shown in FIG. 17. The LED drive circuit of this embodiment shown in FIG. 17 is provided with: a bridge diode 2; a constant current circuit A17; a switching circuit C17; resistors R17_1 to R17_3; a positive temperature coefficient resistor (hereinafter, referred to as "PTC resistor") RP17; and a capacity CAP17. Note that the switching circuit C17 is configured as shown in FIG. 14 or 15.

The bridge diode 2 is, at an input end thereof, connected to the commercially available AC 100 V power source 1 and is, at one output end thereof, connected to the anode of the LED module 3. The constant current circuit A17 is, at a constant current terminal T1 thereof, connected to the cathode of the LED module 3 and is, at a constant current terminal T2 thereof, connected to a contact terminal T4 of the switching circuit C17. The contact terminal T5 of the switching circuit C17 is connected to the other output end of the bridge diode 2. Moreover, the resistor R17_1 is, at one end thereof, connected to the cathode of the LED module 3 and is, at the other end thereof, connected to a bias current terminal T3 of the constant current circuit A17 and one end of the resistor R17_2. The other end of the resistor R17_2 is connected to the control terminal T6 of the switching circuit C17, to one end of the resistor R17_3, and to one end of the capacity CAP17 via the PTC resistor RP17. The other end of the resistor R17_3 and the other end of the capacity CAP17 are connected to the other output end of the bridge diode 2.

From the cathode of the LED module 3, a bias current is fed to the control terminal T6 of the switching circuit C17 via the resistors R17_1 and R17_2 and the PTC resistor RP17.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A17 (constant current value of the constant current circuit A17).

In the LED drive circuit of this embodiment shown in FIG. 17, as the ambient temperature rises, a resistance value of the PTC resistor RP17 is increased; accordingly, a phase angle of the thyristor or triac inside the switching circuit C17 is delayed in accordance with the resistance value of the PTC resistor RP17 and a capacity value of the capacity CAP17, with the result that the constant current value of the constant current circuit A17 is limited. When the ambient temperature of the LED drive circuit of this embodiment shown in FIG. 17 reaches a certain level set in advance or higher, the phase of the thyristor or triac inside the switching circuit C17 is rotated by 180°; consequently, the switching circuit C17 is placed in the off state, and the constant current circuit A17 is placed in the off state.

<Twelfth Embodiment>

Figure 18:
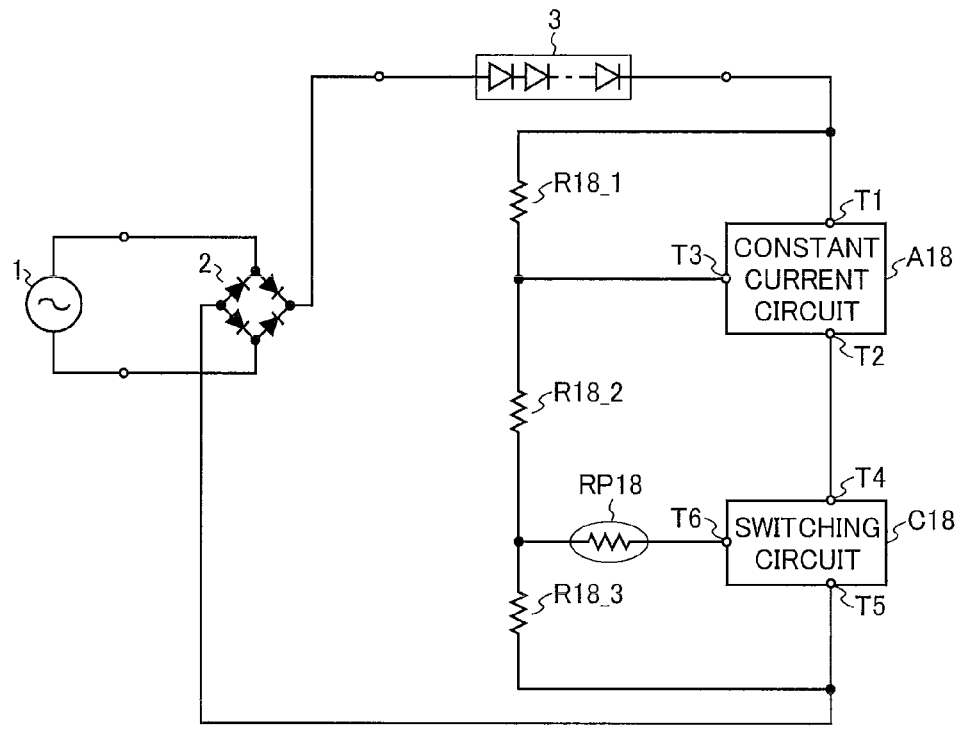
FIG. 18 is a diagram showing a configuration of an LED drive circuit according to a twelfth embodiment of the present invention.

A configuration of an LED drive circuit according to a twelfth embodiment of the present invention is shown in FIG. 18. The LED drive circuit of this embodiment shown in FIG. 18 is provided with: a bridge diode 2; a constant current circuit A18; a switching circuit C18; resistors R18_1 to R18_3; and a positive temperature coefficient resistor (hereinafter, referred to as "PTC resistor") RP18. Note that the switching circuit C18 is configured as shown in FIG. 14 or 15.

The bridge diode 2 is, at an input end thereof, connected to the commercially available AC 100 V power source 1 and is, at one output end thereof, connected to the anode of the LED module 3. The constant current circuit A18 is, at a constant current terminal T1 thereof, connected to the cathode of the LED module 3 and is, at a constant current terminal T2 thereof, connected to a contact terminal T4 of the switching circuit C18. A contact terminal T5 of the switching circuit C18 is connected to the other output end of the bridge diode 2. Moreover, the resistor R18_1 is, at one end thereof, connected to the cathode of the LED module 3 and is, at the other end thereof, connected to a bias current terminal T3 of the constant current circuit A18 and one end of the resistor R18_2. The other end of the resistor R18_2 is connected to one end of the PTC resistor RP18 and one end of the resistor R18_3. The other end of the PTC resistor RP18 is connected to a control terminal T6 of the switching circuit C18. The other end of the resistor R18_3 is connected to the other output end of the bridge diode 2.

From the cathode of the LED module 3, a bias current is fed to the control terminal T6 of the switching circuit C18 via the resistors R18_1 and R18_2 and the PTC resistor RP18.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A18 (constant current value of the constant current circuit A18).

In the LED drive circuit of this embodiment shown in FIG. 18, as the ambient temperature rises, a resistance value of the PTC resistor RP18 is increased; accordingly, a phase of the thyristor or triac inside the switching circuit C18 is delayed, with the result that the constant current value of the constant current circuit A18 is limited. When the ambient temperature of the LED drive circuit of this embodiment shown in FIG. 18 reaches a certain level set in advance or higher, the thyristor or triac inside the switching circuit C18 runs short of a gate current; consequently, the switching circuit C18 is placed in the off state, and the constant current circuit A18 is placed in the off state.

<Thirteenth Embodiment>

Figure 19:
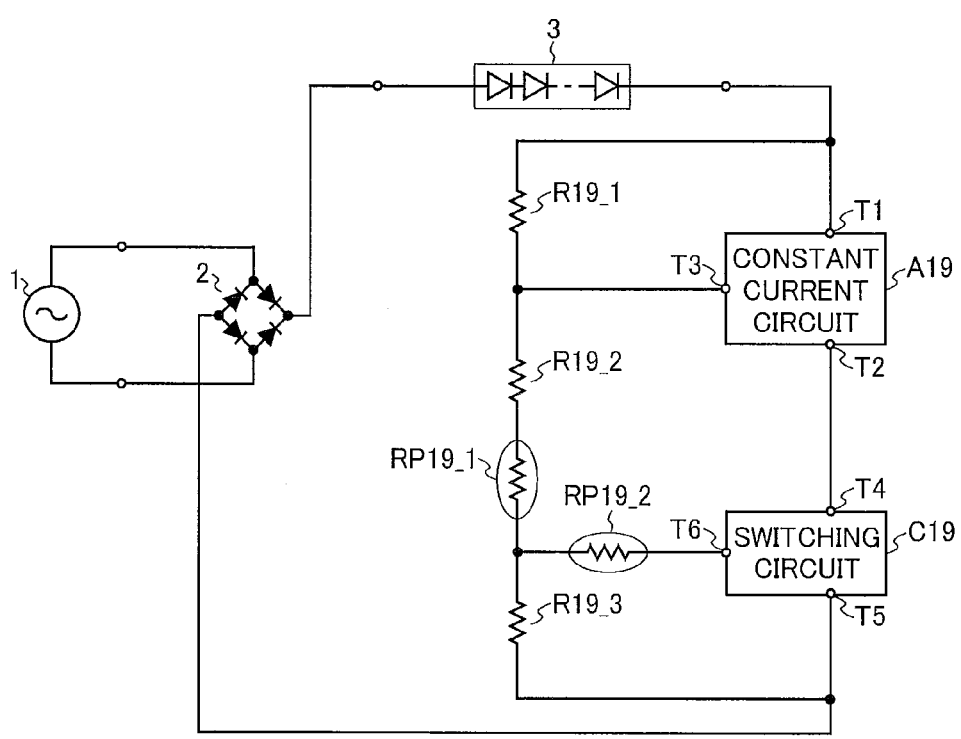
FIG. 19 is a diagram showing a configuration of an LED drive circuit according to a thirteenth embodiment of the present invention.
Figure 20:
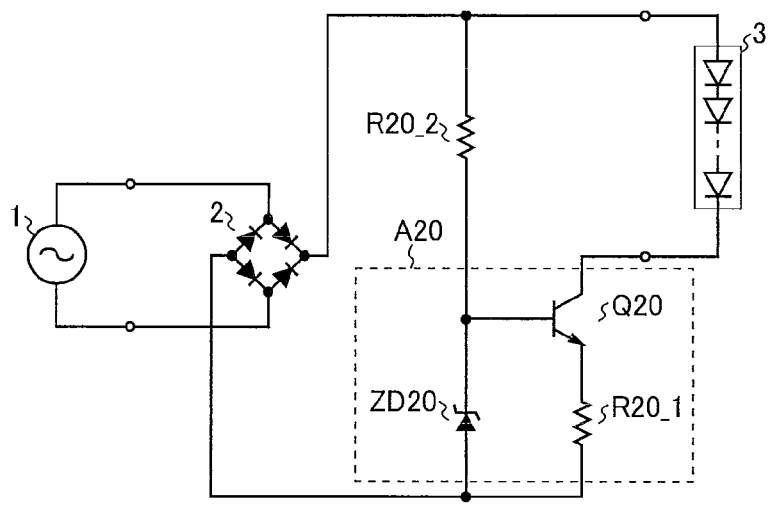
FIG. 20 is a diagram showing a conventional LED drive circuit.

A configuration of an LED drive circuit according to a thirteenth embodiment of the present invention is shown in FIG. 19. The LED drive circuit of this embodiment shown in FIG. 19 is provided with: a bridge diode 2; a constant current circuit A19; a switching circuit C19; resistors R19_1 to R19_3; and a positive temperature coefficient resistors (hereinafter, referred to as "PTC resistors") RP19_1 and RP19_2. Note that the switching circuit C19 is configured as shown in FIG. 14 or 15.

The bridge diode 2 is, at an input end thereof, connected to the commercially available AC 100 V power source 1 and is, at one output end thereof, connected to the anode of the LED module 3. The constant current circuit A19 is, at a constant current terminal T1 thereof, connected to the cathode of the LED module 3 and is, at a constant current terminal T2 thereof, connected to a contact terminal T4 of the switching circuit C19. A contact terminal T5 of the switching circuit C19 is connected to the other output end of the bridge diode 2. Moreover, the resistor R19_1 is, at one end thereof, connected to the cathode of the LED module 3 and is, at the other end thereof, connected to a bias current terminal T3 of the constant current circuit A19 and one end of the resistor R19_2. The other end of the resistor R19_2 is connected to one end of the PCT resistor RP19_2 and one end of the resistor R19_3 via the PTC resistor RP19_1. The other end of the PCT resistor RP19_2 is connected to a control terminal T6 of the switching circuit C19. The other end of the resistor R19_3 is connected to the other output end of the bridge diode 2.

From the cathode of the LED module 3, a bias current is fed to the control terminal T6 of the switching circuit C19 via the resistors R19_1 and R19_2, and then via the PTC resistors RP19_1 and RP19_2.

An AC voltage outputted from the commercially available AC 100 V power source 1 is fully rectified by the bridge diode 2, and thereby a pulsating voltage having its peak of approximately 141 V is obtained and applied to the LED module 3; accordingly, a current passing through the LED module 3 is made to pulsate as well, with its peak value equal to a value set for the constant current circuit A19 (constant current value of the constant current circuit A19).

In the LED drive circuit of this embodiment shown in FIG. 19, as the ambient temperature rises, resistance values of the PTC resistors RP19_1 and RP19_2 are increased; accordingly, a phase angle of the thyristor or triac inside the switching circuit C19 is delayed, with the result that the constant current value of the constant current circuit A19 is limited. When the ambient temperature of the LED drive circuit of this embodiment shown in FIG. 19 reaches a certain level set in advance or higher, the thyristor or triac inside the switching circuit C19 runs short of a gate current; consequently, the switching circuit C19 is placed in the off state, and the constant current circuit A19 is placed in the off state.

<Fourteenth Embodiment>

Figure 21:
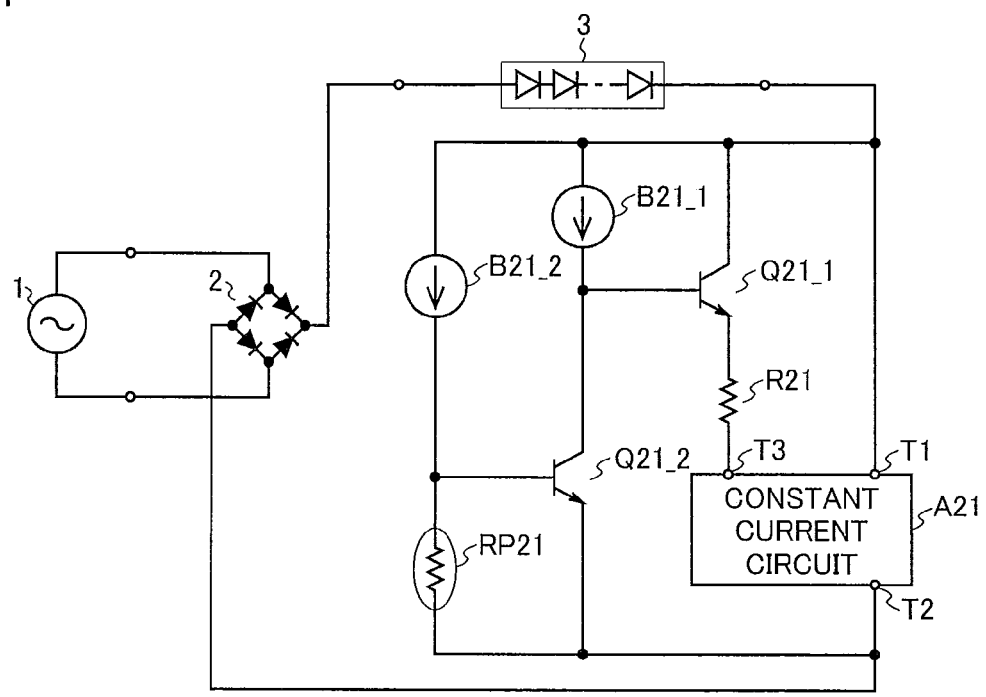
FIG. 21 is a diagram showing a configuration of an LED drive circuit according to a fourteenth embodiment of the present invention.

A configuration of an LED drive circuit in a fourteenth embodiment of the present invention is shown in FIG. 21. The LED drive circuit of this embodiment shown in FIG. 21 is provided with: a bridge diode 2; constant current circuits A21, B21_1, and B21_2; NPN transistors Q21_1 and Q21_2; a resistor R21; and a positive temperature coefficient resistor (hereinafter, referred to as "PTC resistor") RP21.

The bridge diode 2 is, at an input end thereof, connected to the commercial available AC 100 V power source 1 and is, at one output end thereof, connected to the anode of the LED module 3. The constant current circuit A21 is, at a constant current terminal T1 thereof, connected to the cathode of the LED module 3 and is, at a constant current terminal T2 thereof, connected to the other output end of the bridge diode 2. The NPN transistor Q21_1 is, at a collector thereof, connected to the cathode of the LED module 3 and is, at an emitter thereof, connected to a bias current terminal T3 of the constant current circuit A21 via the resistor R21. Moreover, the constant current circuit B21_1 is connected between a base of the NPN transistor Q21_1 and the cathode of the LED module 3. The NPN transistor Q21_2 is, at a collector thereof, connected to the base of the NPN transistor Q21_1 and is, at an emitter thereof, connected, like the constant current circuit T2, to the other output end of the bridge diode 2. Furthermore, the constant current circuit B21_2 is provided between the cathode of the LED module 3 and a base of the NPN transistor Q21_2, and the PTC resistor RP21 is provided between the base and the emitter of the NPN transistor Q21_2.

The NPN transistor Q21_1 is controlled by the constant current circuit B21_1 and the NPN transistor Q21_2, and thereby feeds a bias current to the bias current terminal T3 of the constant current circuit A21. In the LED drive circuit of this embodiment shown in FIG. 21, so that an output of the constant current circuit A21 that feeds a constant current to the LED module 3 and that thereby drives that LED module 3 is limited, the NPN transistor Q21_2 controls a base current of the NPN transistor Q21_1, and thereby a bias current that is fed to the bias current terminal T3 of the constant current circuit A21 is limited.

An AC voltage outputted from the commercial available power source AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A21 (constant current value of the constant current circuit A21).

In the LED drive circuit of this embodiment shown in FIG. 21, as the ambient temperature rises, a resistance value of the PTC resistor RP21 is increased, leading to an increase in voltage between the base and the emitter of the NPN transistor Q21_2. Accordingly, a base current of the NPN transistor Q21_1 is decreased, and the bias current that is fed to the bias current terminal T3 is decreased; consequently, the constant current of the constant current circuit A21 is limited. When the ambient temperature of the LED drive circuit of this embodiment shown in FIG. 21 reaches a certain level set in advance or higher, the NPN transistor Q21_1 is placed in the off state, with the result that no bias current is fed to the bias current terminal T3 of the constant current circuit A21. Thus, the constant current circuit A21 is placed in the off state.

With the PTC resistor RP21 arranged between the base and the emitter of the NPN transistor Q21_2, it is possible to use, for the PTC resistor RP21, a device whose rate power is low or a device whose withstand voltage is not high, without problem, by setting its resistance value to an appropriate value.

<Fifteenth Embodiment>

Figure 22:
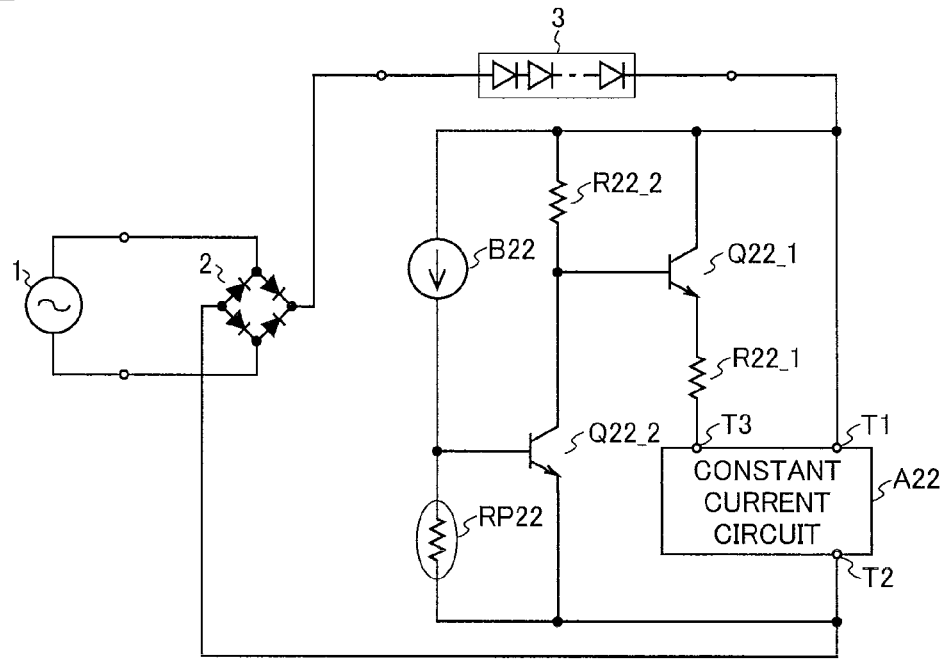
FIG. 22 is a diagram showing a configuration of an LED drive circuit according to a fifteenth embodiment of the present invention.

A configuration of an LED drive circuit according to a fifteenth embodiment of the present invention is shown in FIG. 22. The LED drive circuit of this embodiment shown in FIG. 22 is provided with: a bridge diode 2; constant current circuits A22 and B22; NPN transistors Q22_1 and Q22_2; resistors R22_1 and R22_2; and a positive temperature coefficient resistor (hereinafter, referred to as "PTC resistor") RP22.

The bridge diode 2 is, at an input end thereof, connected to the commercially available AC 100 V power source 1 and is, at one output end thereof, connected to the anode of the LED module 3. The constant current circuit A22 is, at a constant terminal T1 thereof, connected to the cathode of the LED module 3 and is, at a constant terminal T2 thereof, connected to the other output end of the bridge diode 2. The NPN transistor Q22_1 is, at a collector thereof, connected to the cathode of the LED module 3 and is, at an emitter thereof, connected to a bias current terminal T3 of the constant current circuit A22 via the resistor R22_1. Moreover, the resistor R22_2 is connected between a base of the NPN transistor Q22_1 and the cathode of the LED module 3. The NPN transistor Q22_2 is, at a collector thereof, connected to the base of the NPN transistor Q22_1 and is, at an emitter thereof, connected, like the constant current terminal T2, to the other output end of the bridge diode 2. Furthermore, the constant current circuit B22 is provided between the cathode of the LED module 3 and the base of the NPN transistor Q22_2, and the PTC resistor RP22 is provided between the base and the emitter of the NPN transistor Q22_2.

The NPN transistor Q22_1 is controlled by the resistor R22_2 and the NPN transistor Q22_2, and thereby feeds a bias current to the bias current terminal T3 of the constant current circuit A22. In the LED drive circuit of this embodiment shown in FIG. 22, so that an output of the constant current circuit A22 that feeds a constant current to the LED module 3 and that thereby drives that LED module 3 is limited, the NPN transistor Q22_2 controls a base current of the NPN transistor Q22_1, and thereby the bias current that is fed to the bias current terminal T3 of the constant current circuit A22 is limited.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A22 (constant current value of the constant current circuit A22).

In the LED drive circuit of this embodiment shown in FIG. 22, as the ambient temperature rises, a resistance value of the PTC resistor RP22 is increased, leading to an increase in voltage between the base and the emitter of the NPN transistor Q22_2. Accordingly, a base current of the NPN transistor Q22_2 is decreased, and thus the bias current that is fed to the bias current terminal T3 is decreased, with the result that the constant current value of the constant current circuit A22 is limited. When the ambient temperature of the LED drive circuit of this embodiment shown in FIG. 22 reaches a certain level set in advance or higher, the NPN transistor Q22_1 is placed in the off state, with the result that no bias current is fed to the bias current terminal T3 of the constant current circuit A22. Thus, the constant current circuit A22 is placed in the off state.

With the PTC resistor RP22 arranged between the base and the emitter of the NPN transistor Q22_2, it is possible to use, for the PTC resistor RP22, a device whose rate power is low or a device whose withstand voltage is not high, without problem, by setting its resistance value to an appropriate value.

<Sixteenth Embodiment>

Figure 23:
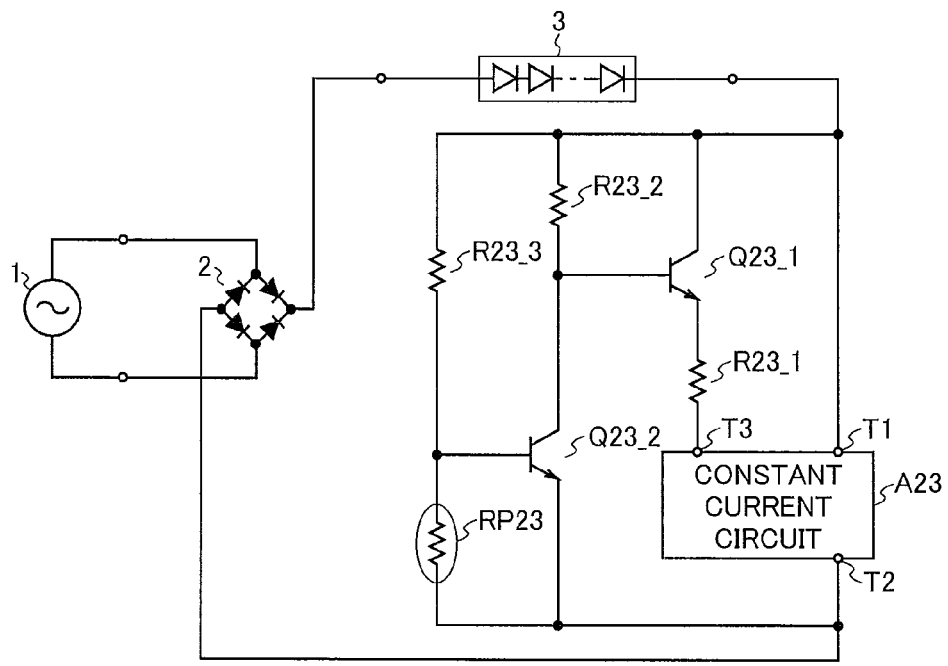
FIG. 23 is a diagram showing a configuration of an LED drive circuit according to a sixteenth embodiment of the present invention.

A configuration of an LED drive circuit according to a sixteenth embodiment of the present invention is shown in FIG. 23. The LED drive circuit of this embodiment shown in FIG. 23 is provided with: a bridge diode 2; a constant current circuit A23; NPN transistors Q23_1 and Q23_2; resistors R23_1 to R23_3; and a positive temperature coefficient resistor (hereinafter, referred to as "PTC resistor") RP23.

The bridge diode 2 is, at an input end thereof, connected to the commercially available AC 100 V power source 1 and is, at one output end thereof, connected to the anode of the LED module 3. The constant current circuit A23 is, at a constant current terminal T1 thereof, connected to the cathode of the LED module 3 and is, at a constant current terminal T2 thereof, connected to the other output end of the bridge diode 2. The NPN transistor Q23_1 is, at a collector thereof, connected to the cathode of the LED module 3 and is, at an emitter thereof, connected to a bias current terminal T3 of the constant current circuit A23 via the resistor R23_1. Moreover, the resistor R23_2 is connected between a base of the NPN transistor Q23_1 and the cathode of the LED module 3. The NPN transistor Q23_2 is, at a collector thereof, connected to the base of the NPN transistor Q23_1 and is, at an emitter thereof, connected, like the constant current circuit terminal T2, to the other output end of the bridge diode 2. Furthermore, the resistor R23_3 is provided between the cathode of the LED module 3 and a base of the NPN transistor Q23_2, and the PTC resistor RP23 is provided between the base and the emitter of the NPN transistor Q23_2.

The NPN transistor Q23_1 is controlled by the resistor R23_2 and the NPN transistor Q23_2, and thereby feeds a bias current to the bias current terminal T3 of the constant current circuit A23. In the LED drive circuit of this embodiment shown in FIG. 23, so that an output of the constant current circuit A23 that feeds a constant current to the LED module 3 and that thereby drives that LED module 3 is limited, the NPN transistor Q23_2 controls a base current of the NPN transistor Q23_1, and thereby the bias current that is fed to the bias current terminal T3 of the constant current circuit A23 is limited.

An AC voltage outputted from the commercially available AC 100 V power source 1 is fully rectified by the bridge diode 2, and thereby a pulsating voltage having its peak of approximately 141 V is obtained and applied to the LED module 3. Accordingly, a current passing through the LED module 3 is made to pulsate as well, with its peak value equal to a value set for the constant current circuit A23 (constant current value of the constant current circuit A23).

In the LED drive circuit of this embodiment shown in FIG. 23, as the ambient temperature rises, a resistance value of the PTC resistor RP23 is increased, leading to an increase in a voltage between the base and the emitter of the NPN transistor Q23_2. Accordingly, a base current of the NPN transistor Q23_1 is decreased, and the bias current that is fed to the bias current terminal T3 is decreased; consequently, the constant current value of the constant current circuit A23 is limited. When the ambient temperature of the LED drive circuit of this embodiment shown in FIG. 23 reaches a certain level set in advance or higher, the NPN transistor Q23_1 is placed in the off state, with the result that no bias current is fed to the bias current terminal T3 of the constant current circuit A23. Thus, the constant current circuit A23 is placed in the off state.

With the PTC resistor RP23 arranged between the base and the emitter of the NPN transistor Q23_2, it is possible to use, for the PTC resistor RP23, a device whose power rating is low or a device whose withstand voltage is not high, without problem, by setting its resistance value to an appropriate value.

Moreover, the resistor R23_3 feeds a base current to the NPN transistor Q23_2, and a current passing through the resistor R23_2 is used to control the NPN transistor Q23_1 that feeds a bias current to the bias current terminal T3 of the constant current circuit A23. So long as a resistance value of the resistor R23_3 is set to an appropriate value, when the LED module 3 and the like become abnormal (short-circuited, or nearly short-circuited) with a possibility that a voltage falling out of a normal operating range is applied to the constant current circuit A23, a voltage between the base and the emitter of the NPN transmitter Q23_2 is increased, a voltage between the base and the emitter of the NPN transistor Q23_1 is decreased, the bias current that is fed to the bias current terminal T3 is decreased, and consequently the constant current value of the constant current circuit A23 is limited, despite a temperature set for the over-temperature protection operation being not reached. Thus, it is possible to use the resistor R23_3 as an over-temperature protection circuit that limits the constant current value of the constant current circuit A23.

<Others>

In the switching circuit shown in FIG. 14, the thyristor TTY14 can be replaced by a photothyristor, and in the switching circuit shown in FIG. 15, the triac TRI15 can be replaced by a phototriac. To do so, a cathode wire on the input side needs to be connected to a ground.

The input voltage of the LED drive circuit of the present invention is not limited to a voltage of 100 V which is commercially supplied in Japan. By setting a circuit constant of the LED drive circuit of the present invention to an appropriate value, it is possible to use, as the input voltage of the LED drive circuit of the present invention, a voltage commercially supplied in other countries or a reduced alternating voltage.

Moreover, by adding a protection device, such as a current fuse, to the LED drive circuit of the present invention, it is possible to provide a resulting LED drive apparatus with increased safety.

Moreover, in each of FIGS. 1 to 19, and in FIGS. 21 to 23, except FIGS. 10 to 15, it is possible to connect the one end of the constant current circuit or the resistor that feeds a current to the corresponding resistor having the positive or negative temperature coefficient not only to the cathode of the LED module, but also to the anode of the LED module by setting the current or resistance value to an appropriate value.

For example, in the case of FIG. 1, the one end of the NTC resistor RN1 is connected to the cathode of the LED module 3, and in the case of FIG. 5, the one end of the constant current circuit B5 is connected to the cathode of the LED module 3. Each end can also be connected to the anode of the LED module 3.

This makes it possible to surely turn on and off or limit the constant current circuits A1 to A19 and the switching circuits C5 to C19 well before the constant current circuits A1 to A19 are activated.

Moreover, by properly selecting a constant current circuit and a switching circuit from among the constant current circuits shown in FIGS. 10 to 13 and the switching circuits shown in FIGS. 14 and 15, respectively, and by properly connecting them, it is possible to connect the LED drive circuit equipped with an over-temperature protection function between the bridge diode and the anode of the LED module.

An over-temperature protection portion is a section that is formed with a thermistor, etc. whose resistance value greatly varies with a temperature, and that limits a current when an over-temperature phenomenon occurs. A thermistor, etc. is disposed in a heat-generating area or in its vicinity so as to detect an over-temperature. Moreover, like some incandescent lamps, etc. provided with a light dimmer circuit in a stage succeeding an AC power source so that light is controlled, a circuit according to the present invention may be provided with a light dimmer circuit so as to perform light control.

What is claimed is:

1. An LED drive circuit that drives an LED, comprising:
    a rectifying circuit that converts an alternating voltage into a pulsating voltage;
    a constant current circuit; and an over-temperature protection portion that limits an output of the constant current circuit, wherein
    the LED and the constant current circuit are connected in series on an output side of the rectifying circuit, and wherein
    the constant current circuit and the over-temperature protection portion do not have common component.

2. The LED drive circuit of claim 1, wherein the over-temperature protection portion comprises:
    a PNP transistor; and
    a resistor having a negative temperature coefficient, and provided between a base and an emitter of the PNP transistor.

3. The LED drive circuit of claim 2, wherein
    the emitter and an collector of the PNP transistor are connected to a path through which a constant current outputted from the constant current circuit is passed.

4. The LED drive circuit of claim 2, wherein the over-temperature protection portion further comprises:
    a constant current source connected in series with the resistor having the negative temperature coefficient, wherein
    a value of a voltage between the base and the emitter of the PNP transistor is a product obtained by multiplying a constant current value of the constant current source by a resistance value of the resistor having the negative temperature coefficient.

5. The LED drive circuit of claim 2, wherein the over-temperature protection portion further comprises:
    a resistor element connected in series with the resistor having the negative temperature coefficient, wherein
    a value of a voltage between the base and the emitter of the PNP transistor is a product obtained by multiplying a current value of a current passing through the resistor having the negative temperature coefficient and the resistor element by a resistance value of the resistor having the negative temperature coefficient.

6. The LED drive circuit of claim 1, wherein the over-temperature protection portion comprises:
    an NPN transistor; and
    a resistor having a negative temperature coefficient, and provided between a base and an emitter of the NPN transistor, wherein
    the emitter and a collector of the NPN transistor are connected to a path through which a constant current outputted from the constant current circuit is passed.

7. The LED drive circuit of claim 1, further comprising:
    a switching circuit that switches turning-on and -off of the constant current circuit, wherein
    the LED, the constant current circuit, and the switching circuit are connected in series on an output side of the rectifying circuit, and
    the over-temperature protection portion controls the switching circuit.

8. The LED drive circuit of claim 7, wherein the over-temperature protection portion comprises:
    a bipolar transistor that feeds a bias current to a control terminal of the switching circuit; and
    a resistor having a negative temperature coefficient, and having one end thereof connected to a base of the bipolar transistor, wherein
    a voltage between the base and an emitter of the bipolar transistor is varied in accordance with a resistance value of the resistor having the negative temperature coefficient.

9. The LED drive circuit of claim 8, wherein the over-temperature protection portion further comprises:
    a constant current source connected in series with the resistor having the negative temperature coefficient, wherein
    a value of the voltage between the base and the emitter of the bipolar transistor is a product obtained by multiplying a constant current value of the constant current source by the resistance value of the resistor having the negative temperature coefficient.

10. The LED drive circuit of claim 8, wherein the over-temperature protection portion further comprises:
    a resistor element connected in series with the resistor having the negative temperature coefficient, wherein
    a value of the voltage between the base and the emitter of the bipolar transistor is a product obtained by multiplying a value of a current passing through the resistor having the negative temperature coefficient and the resistor element by the resistance value of the resistor having the negative temperature coefficient.

11. The LED drive circuit of claim 7, wherein the over-temperature protection portion comprises:
    an NPN transistor that pulls a bias current that is fed to a control terminal of the switching circuit;
    a resistor having a positive temperature coefficient, and having one end thereof connected to a base of the NPN transistor, wherein
    a voltage between the base and an emitter of the NPN transistor is varied in accordance with a resistance value of the resistor having the positive temperature coefficient.

12. The LED drive circuit of claim 11, wherein the over-temperature protection portion further comprises:
    a constant current source connected in series with the resistor having the positive temperature coefficient, wherein
    a value of the voltage between the base and the emitter of the NPN transistor is a product obtained by multiplying a constant current value of the constant current source by the resistance value of the resistor having the positive temperature coefficient.

13. The LED drive circuit of claim 11, wherein the over-temperature protection portion further comprises:
a resistor element connected in series with the resistor having the positive temperature coefficient, wherein
a value of the voltage between the base and the emitter of the NPN transistor is a product obtained by multiplying a value of a current passing through the resistor having the positive temperature coefficient and the resistor element by the resistance value of the resistor having the positive temperature coefficient.

14. The LED drive circuit of claim 7, wherein the switching circuit comprises:
a thyristor or a triac; and
a first resistor provided between a gate and a cathode of the thyristor or the triac.

15. The LED drive circuit of claim 7, wherein
the switching circuit comprises:
a thyristor or a triac; and
a first resistor provided between a gate and a cathode of the thyristor or the triac, and
the over-temperature protection portion comprises:
a resistor having a positive temperature coefficient, and provided on a path through which a bias current is fed to the gate of the thyristor or the triac; and
a resistor element provided between the gate of the thyristor or the triac and a negative polarity output end of the rectifying circuit.

16. The LED drive circuit of claim 15, wherein the over-temperature protection portion comprises:
a capacitor connected in parallel with the resistor element.

17. The LED drive circuit of claim 7, wherein
the switching circuit comprises:
a thyristor or a triac; and
a first resistor having a positive temperature coefficient, and provided between a gate and a cathode of the thyristor or the triac, and
the over-temperature protection portion comprises:
a resistor having a positive temperature coefficient, and having one end thereof connected to the gate of the thyristor or the triac; and
a resistor element provided between another end of the resistor having the positive temperature coefficient and a negative polarity output end of the rectifying circuit.

18. The LED drive circuit of claim 17, wherein the over-temperature protection portion, further comprises:
another resistor having a positive temperature coefficient, and provided separately from the resistor having the positive temperature coefficient, wherein
the other resistor having the positive temperature coefficient is provided on a path through which a bias current is fed to the gate of the thyristor or the triac.

19. The LED drive circuit of claim 1, wherein the over-temperature protection portion comprises:
an NPN transistor that pulls a bias current that is fed to the constant current circuit; and
a resistor having a positive temperature coefficient, and provided between a base and an emitter of the NPN transistor.

20. The LED drive circuit of claim 19, wherein the over-temperature protection portion comprises:
a constant current source connected in series with the resistor having the positive temperature coefficient, wherein
a value of a voltage between the base and the emitter of the NPN transistor is a product obtained by multiplying a constant current value of the constant current source by a resistance value of the resistor having the positive temperature coefficient.

21. The LED drive circuit of claim 19, wherein the over-temperature protection portion further comprises:
a resistor element connected in series with the resistor having the positive temperature coefficient, wherein
a value of a voltage between the base and the emitter of the NPN transistor is a product obtained by multiplying a value of a current passing through the resistor having the positive temperature coefficient and the resistor element by a resistance value of the resistor having the positive temperature coefficient.

22. The LED drive circuit of claim 19, wherein the over-temperature protection portion, further comprises:
another resistor having a positive temperature coefficient, and provided separately from the resistor having the positive temperature coefficient, wherein
the other resistor having the positive temperature coefficient is provided on a path through which the bias current is fed to the constant current circuit.

23. The LED drive circuit of claim 1, wherein the over-temperature protection portion comprises:
a first NPN bipolar transistor that feeds a bias current to a bias current terminal of the constant current circuit;
a second NPN bipolar transistor for control and a first constant current source, each connected to a base of the first NPN bipolar transistor and provided for controlling the bias current;
a resistor having a positive temperature coefficient, and having one end thereof connected to a base of the second NPN bipolar transistor for control; and
a second constant current source connected in series with the resistor having the positive temperature coefficient, wherein
a value of a voltage between the base and an emitter of the second NPN bipolar transistor for control is a product obtained by multiplying a constant current value of the second constant current source by a resistance value of tie resistor having the positive temperature coefficient.

24. The LED drive circuit of claim 1, wherein the over-temperature protection portion comprises:
a first NPN bipolar transistor that feeds a bias current to a bias current terminal of the constant current circuit;
a second NPN bipolar transistor for control and a resistor element, each connected to a base of the first NPN bipolar transistor and provided for controlling the bias current;
a resistor having a positive temperature coefficient, and having one end thereof connected to a base of the second NPN bipolar transistor for control; and
a constant current source connected in series with the resistor having the positive temperature coefficient, wherein
a value of a voltage between the base and an emitter of the second NPN bipolar transistor for control is a product obtained by multiplying a constant current value of the constant current source by a resistance value of the resistor having the positive temperature coefficient.

25. The LED drive circuit of claim 1, wherein the over-temperature protection portion comprises:
a first NPN bipolar transistor that feeds a bias current to a bias current terminal of the constant current circuit;
a second NPN bipolar transistor for control and a first resistor element, each connected to a base of the first NPN bipolar transistor and provided for controlling the bias current;

a resistor having a positive temperature coefficient, and having one end thereof connected to a base of the second NPN bipolar transistor for control; and a second resistor element connected in series with the resistor having the positive temperature coefficient, wherein a value of a voltage between the base and an emitter of the second NPN bipolar transistor for control is a product obtained by multiplying a value of a current passing through the resistor having the positive temperature coefficient and the second resistor element by a resistance value of the resistor having the positive temperature coefficient.

26. The LED drive circuit of claim 1, wherein the constant current circuit comprises:
a first resistor;
a Zener diode; and
a first bipolar transistor of which an emitter is connected to one end of the first resistor and of which a base is connected to one end of the Zener diode.

27. The LED drive circuit of claim 1, wherein the constant current circuit comprises:

a first bipolar transistor;
a second bipolar transistor;
a first resistor having one end thereof connected to a base of the second bipolar transistor; and
a second resistor provided between a base and an emitter of the first bipolar transistor, wherein
a collector of the first bipolar transistor and the base of the second bipolar transistor are connected together, and
the base of the first bipolar transistor and an emitter of the second bipolar transistor are connected together.

28. The LED drive circuit of claim 1, wherein
the over-temperature protection portion limits the output of the constant current circuit when the constant current circuit reaches a predetermined temperature or higher.

29. The LED drive circuit of claim 1, wherein
the over-temperature protection portion limits the output of the constant current circuit when the LED module reaches a predetermined temperature or higher.

* * * * *